United States Patent
Wentink

(10) Patent No.: US 9,912,395 B2
(45) Date of Patent: Mar. 6, 2018

(54) PHYSICAL LAYER HEADER WITH ACCESS POINT IDENTIFIER

(71) Applicant: QUALCOMM Incorporated, San Diego, CA (US)

(72) Inventor: Maarten Menzo Wentink, Naarden (NL)

(73) Assignee: QUALCOMM, Incorporated, San Diego, CA (US)

( * ) Notice: Subject to any disclaimer, the term of this patent is extended or adjusted under 35 U.S.C. 154(b) by 169 days.

(21) Appl. No.: 14/623,540

(22) Filed: Feb. 17, 2015

(65) Prior Publication Data
US 2015/0162969 A1  Jun. 11, 2015

Related U.S. Application Data

(62) Division of application No. 13/231,726, filed on Sep. 13, 2011, now Pat. No. 8,989,213.
(Continued)

(51) Int. Cl.
*H04B 7/06* (2006.01)
*H04W 74/08* (2009.01)
(Continued)

(52) U.S. Cl.
CPC ...... *H04B 7/0697* (2013.01); *H04W 74/0816* (2013.01); *H04W 76/02* (2013.01); *H04W 74/04* (2013.01)

(58) Field of Classification Search
CPC ............ H04B 7/0697; H04W 36/0077; H04W 36/08; H04W 36/26; H04W 48/00;
(Continued)

(56) References Cited

U.S. PATENT DOCUMENTS 7,944,940 B2   5/2011   Ma et al.
8,619,786 B2   12/2013  Wentink
(Continued)

FOREIGN PATENT DOCUMENTS

CN   101714883 A    5/2010
JP   2005039728 A   2/2005
(Continued)

OTHER PUBLICATIONS

A Brief Tutorial on the PHY and MAC layers of the IEEE 802.11b Standard; Benjamin E. Henty; Jul. 12, 2001.*
(Continued)

*Primary Examiner* — Benjamin H Elliott, IV
(74) *Attorney, Agent, or Firm* — Patterson & Sheridan, LLP

(57) ABSTRACT

Certain aspects of the present disclosure provide methods and apparatus for utilizing a physical layer (PHY) header comprising an identifier for an access point (AP) or a Basic Service Set (BSS). A station (STA) that is assigned an order in a sequential response sequence may count only frames with PHY headers that contain the correct identifier. A STA may terminate its sequential access procedure when it receives a frame with a PHY header that specifies a different identifier for the AP or BSS that assigned the sequence. In this manner, the STA may prevent partly synchronizing to an overlapping network and avoid accessing the wireless medium at the wrong time.

21 Claims, 29 Drawing Sheets

Related U.S. Application Data

(60) Provisional application No. 61/388,852, filed on Oct. 1, 2010, provisional application No. 61/383,252, filed on Sep. 15, 2010.

(51) Int. Cl.
*H04W 76/02* (2009.01)
*H04W 74/04* (2009.01)

(58) Field of Classification Search
CPC ..... H04W 48/20; H04W 74/00; H04W 88/08; H04W 76/02
See application file for complete search history.

(56) References Cited

U.S. PATENT DOCUMENTS

| | | | |
|---|---|---|---|
| 8,989,213 B2* | 3/2015 | Wentink | H04W 76/02 370/278 |
| 2004/0073797 A1* | 4/2004 | Fascenda | H04L 9/3234 713/171 |
| 2006/0029017 A1* | 2/2006 | Mudulodu | H04L 5/0048 370/328 |
| 2006/0062181 A1 | 3/2006 | Chou | |
| 2006/0139201 A1 | 6/2006 | Nagata et al. | |
| 2006/0227801 A1 | 10/2006 | Nanda et al. | |
| 2007/0086378 A1 | 4/2007 | Matta et al. | |
| 2008/0101320 A1 | 5/2008 | Krahn et al. | |
| 2009/0147893 A1 | 6/2009 | Takahashi et al. | |
| 2009/0252143 A1 | 10/2009 | Sridhara et al. | |
| 2010/0008318 A1 | 1/2010 | Wentink et al. | |
| 2010/0040033 A1 | 2/2010 | Xhafa et al. | |
| 2010/0135319 A1 | 6/2010 | Wang et al. | |
| 2010/0195481 A1 | 8/2010 | Lee et al. | |
| 2010/0220654 A1 | 9/2010 | Wentink | |
| 2010/0220678 A1 | 9/2010 | Wentink | |
| 2011/0002219 A1* | 1/2011 | Kim | H04B 7/0417 370/203 |
| 2011/0040969 A1* | 2/2011 | Yao | H04W 12/06 713/168 |
| 2011/0044298 A1 | 2/2011 | Wentink et al. | |
| 2011/0064013 A1 | 3/2011 | Liu et al. | |
| 2011/0064040 A1 | 3/2011 | Kim et al. | |
| 2011/0096796 A1* | 4/2011 | Zhang | H04B 7/0669 370/474 |
| 2011/0110454 A1 | 5/2011 | Sampath et al. | |
| 2011/0194644 A1* | 8/2011 | Liu | H04L 5/0023 375/295 |
| 2011/0286402 A1 | 11/2011 | Gong et al. | |
| 2012/0002622 A1 | 1/2012 | Mahadevappa et al. | |
| 2012/0063335 A1 | 3/2012 | Cho et al. | |
| 2012/0063433 A1 | 3/2012 | Wentink | |
| 2012/0099568 A1 | 4/2012 | Wentink | |
| 2014/0307726 A1* | 10/2014 | Kang | H04W 76/023 370/338 |
| 2015/0162969 A1* | 6/2015 | Wentink | H04W 76/02 370/338 |

FOREIGN PATENT DOCUMENTS

| | | | |
|---|---|---|---|
| JP | 2005073118 A | 3/2005 | |
| JP | 2005175678 A | 6/2005 | |
| JP | 2006203893 A | 8/2006 | |
| JP | 2007525092 A | 8/2007 | |
| JP | 2007329694 A | 12/2007 | |
| JP | 2010530712 A | 9/2010 | |
| JP | 2012519426 A | 8/2012 | |
| JP | 2013530580 A | 7/2013 | |
| WO | WO-2008156458 A1 | 12/2008 | |
| WO | WO-2009157892 A1 | 12/2009 | |
| WO | WO-2010047763 A1 | 4/2010 | |
| WO | WO-2010099496 A1 | 9/2010 | |
| WO | WO 2011115408 A2 * | 9/2011 | .......... H04W 76/023 |
| WO | WO-2012037284 A1 | 3/2012 | |

OTHER PUBLICATIONS

Nishibayashi Y., et al., "MAC Proposal to IEEE802.11n High Speed WLAN—Part 4: Performance Evaluation of Bidirectional Communication in Selective Repeat Method", Proceedings of the 2005 IEICE Communications Society Conference, Sep. 7, 2005, p. 575.

Stacey R., et al., "Specification Framework for TGac", doc: IEEE 802.11-09/0992r13 IEEE P802.11Wireless LANs Jul. 2010, 25 pages.

Yano K., et al., "Area throughput enhancement of OFDM-based wireless LAN in OBSS environment by physical header modification and adaptive array antenna", Proceedings of the IEEE 20th International Symposium on Personal, Indoor and Mobile Radio Communications, 2009, Sep. 16, 2009, pp. 3059-3063.

Ergen M., "IEEE 802.11 Tutorial", Dept. of Electrical Engineering and Computer Science Univ. of California Berkeley, Jun. 2002.

Draft P802.11z_D2.0, IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 7: Extension to Direct-Link Setup (DLS) (Sep. 30, 2010).

European Search Report—EP13190606—Search Authority—Munich—Nov. 26, 2013.

Gill, "Opportunistic Selection With Interference Alignment for MU-MIMO Networks", Apr. 26, 2011.

IEEE 802.11-2007, "IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).

International Search Report and Written Opinion—PCT/US2011/051641—ISA/EPO—Jan. 9, 2012.

International Search Report and Written Opinion—PCT/US2011/056112—ISA/EPO—Dec. 14, 2011.

Partial International Search Report—PCT/US2011/051641—International Search Authority, European Patent Office, Nov. 14, 2011.

Siwamogsatham S., et al., "A Novel Smart-DCF Scheme for High-Speed WLANs", Communications and Information Technologies, 2007. ISCIT '07, International Symposium on, IEEE, PI, XP031166613, Oct. 1, 2007 (Oct. 1, 2007), pp. 1032-1037.

Siwamogsatham S., et al., "On Backoff Timer Scheduling for Smart-DCF and Performance Evaluation", Advanced Information Networking and Applications—Workshops, 2008. AINAW 2008. 22nd International Conference on, IEEE, Piscataway, NJ, USA, XP031240991, Mar. 25, 2008 (Mar. 25, 2008), pp. 1278-1284.

* cited by examiner

PHYSICAL LAYER HEADER WITH ACCESS POINT IDENTIFIER

CROSS-REFERENCE TO RELATED APPLICATIONS

This application is a Divisional of U.S. patent application Ser. No. 13/231,726 entitled "PHYSICAL LAYER HEADER WITH ACCESS POINT IDENTIFIER," filed Sep. 13, 2011, which claims benefit of U.S. Provisional Patent Application Nos. 61/383,252, entitled "Physical Layer Header with Access Point Identifier" and filed Sep. 15, 2010, and 61/388,852, entitled "Physical Layer Header with Access Point Identifier" and filed Oct. 1, 2010, each of which are herein incorporated by reference.

BACKGROUND

Field

Certain aspects of the present disclosure generally relate to wireless communications and, more particularly, to utilizing a physical layer (PHY) header with an identifier for an access point (AP) or for a Basic Service Set (BSS).

Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In wireless communications systems, medium access control (MAC) protocols are designed to operate to exploit several dimensions of freedom offered by the air link medium. The most commonly exploited dimensions of freedom are time and frequency. For example, in the IEEE 802.11 MAC protocol, the "time" dimension of freedom is exploited through the CSMA (Carrier Sense Multiple Access). The CSMA protocol attempts to ensure that no more than one transmission occurs during a period of potential high interference. Similarly, the "frequency" dimension of freedom can be exploited by using different frequency channels.

Recent developments have led to space as a dimension being a viable option to be used to increase, or at least more efficiently use, existing capacity. Spatial Division Multiple Access (SDMA) can be used for improving utilization of the air link by scheduling multiple terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. Receivers may also have one or more antennas (e.g., MIMO and SIMO). For this example, it is assumed that the transmitter is an access point (AP) and the receivers are stations (STAs). The streams are formed such that a stream targeted at STA-B, for example, is seen as low power interference at STA-C, STA-D, . . . , etc., and this will not cause significant interference and most likely be ignored. In order to form these orthogonal streams, the AP may obtain channel state information (CSI) from each of the receiving STAs. Although CSI can be measured and communicated in several ways, thereby adding complexity, the use of CSI will enhance the configuration of SDMA streams.

Additional complexities arise when MIMO is applied to multi-user (MU) systems. For example, typically, the AP controls the uplink (UL) communication process. However, in certain configurations, the uplink scheduling approach still requires that STAs contend with the AP for channel access. In other words, the AP will act as an additional STA trying to gain access to the transmission medium, thereby affecting all STAs attempting to gain access. Further, as the STAs rely on the AP for scheduling of future UL transmissions, the scheduling scheme does not always work well with certain types of data traffic, such as bursty data traffic.

SUMMARY

Certain aspects of the present disclosure provide a method for wireless communications. The method generally includes receiving a downlink transmission containing a deterministic slot count and determining timing of a transmit opportunity for transmitting a return frame based, at least in part, on the deterministic slot count.

Certain aspects provide a method for wireless communications. The method generally includes setting a NAV for downlink transmissions to one or more stations, sending, to a station, a downlink transmission comprising a deterministic slot for use by the station in determining a transmit opportunity, and receiving, prior to expiration of the NAV setting, an uplink transmission from the station transmitted in a determined transmit opportunity.

Certain aspects of the present disclosure provide an apparatus for wireless communications. The apparatus generally includes means for receiving a downlink transmission containing a deterministic slot count and means for determining timing of a transmit opportunity for transmitting a return frame based, at least in part, on the deterministic slot count.

Certain aspects of the present disclosure provide an apparatus for wireless communications. The apparatus generally includes means for setting a NAV period for downlink transmissions to one or more stations, means for sending, to a station, a downlink transmission comprising a deterministic slot count for use by the station in determining a transmit opportunity, and means for receiving, prior to expiration of the NAV period, an uplink transmission from the station transmitted in a determined transmit opportunity.

Certain aspects of the present disclosure provide an apparatus for wireless communications. The apparatus generally includes at least one processor configured to receive a downlink transmission containing a deterministic slot count, and determine timing of a transmit opportunity for transmitting a return frame based, at least in part, on the deterministic slot count; and a memory coupled with the at least one processor.

Certain aspects of the present disclosure provide an apparatus for wireless communications. The apparatus generally includes at least one processor configured to set a NAV period for downlink transmissions to one or more stations, send, to a station, a downlink transmission comprising a deterministic slot count for use by the station in determining a transmit opportunity, and receive, prior to expiration of the NAV period, an uplink transmission from the station transmitted in a determined transmit opportunity; and a memory coupled with the at least one processor.

Certain aspects of the present disclosure provide a computer-program product for wireless communications. The computer-program product typically includes a computer-readable medium having instructions generally executable for receiving a downlink transmission containing a deterministic slot count and determining timing of a transmit opportunity for transmitting a return frame based, at least in part, on the deterministic slot count.

Certain aspects of the present disclosure provide a computer-program product for wireless communications. The computer-program product typically includes a computer-readable medium having instructions generally executable for setting a NAV period for downlink transmissions to one or more stations, sending, to a station, a downlink transmission comprising a deterministic slot count for use by the station in determining a transmit opportunity, and receiving, prior to expiration of the NAV period, an uplink transmission from the station transmitted in a determined transmit opportunity.

Certain aspects of the present disclosure provide a method for wireless communications. The method generally includes receiving, at a station, a first indication of a set with which the station is associated, receiving a second indication of an order in a sequence at which the station is allowed to transmit, and determining timing for transmitting a frame based, at least in part, on the first and second indications.

Certain aspects of the present disclosure provide an apparatus for wireless communications. The apparatus generally includes means for receiving a first indication of a set with which the apparatus is associated and a second indication of an order in a sequence at which the apparatus is allowed to transmit and means for determining timing for transmitting a frame based, at least in part, on the first and second indications.

Certain aspects of the present disclosure provide an apparatus for wireless communications. The apparatus generally includes a receiver and a processing system. The receiver is typically configured to receive a first indication of a set with which the apparatus is associated and to receive a second indication of an order in a sequence at which the apparatus is allowed to transmit. The processing system is generally configured to determine timing for transmitting a frame based, at least in part, on the first and second indications.

Certain aspects of the present disclosure provide a computer-program product for wireless communications. The computer-program product generally includes a computer-readable medium having instructions executable to receive, at a station, a first indication of a set with which the station is associated; to receive a second indication of an order in a sequence at which the station is allowed to transmit; and to determine timing for transmitting a frame based, at least in part, on the first and second indications.

Certain aspects of the present disclosure provide a method for wireless communications. The method generally includes receiving, at an access point (AP), an association request message from a station, associating the station with the AP, and transmitting a first indication of a set with which the station is associated and to which the AP belongs.

Certain aspects of the present disclosure provide an apparatus for wireless communications. The apparatus generally includes means for receiving an association request message from a station, means for associating the station with the apparatus, and means for transmitting a first indication of a set with which the station is associated and to which the apparatus belongs.

Certain aspects of the present disclosure provide an apparatus for wireless communications. The apparatus generally includes a receiver configured to receive an association request message from a station; a processing system configured to associate the station with the apparatus; and a transmitter configured to transmit a first indication of a set with which the station is associated and to which the apparatus belongs.

Certain aspects of the present disclosure provide a computer-program product for wireless communications. The computer-program product generally includes a computer-readable medium having instructions executable to receive, at an AP, an association request message from a station, to associate the station with the AP, and to transmit a first indication of a set with which the station is associated and to which the AP belongs.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
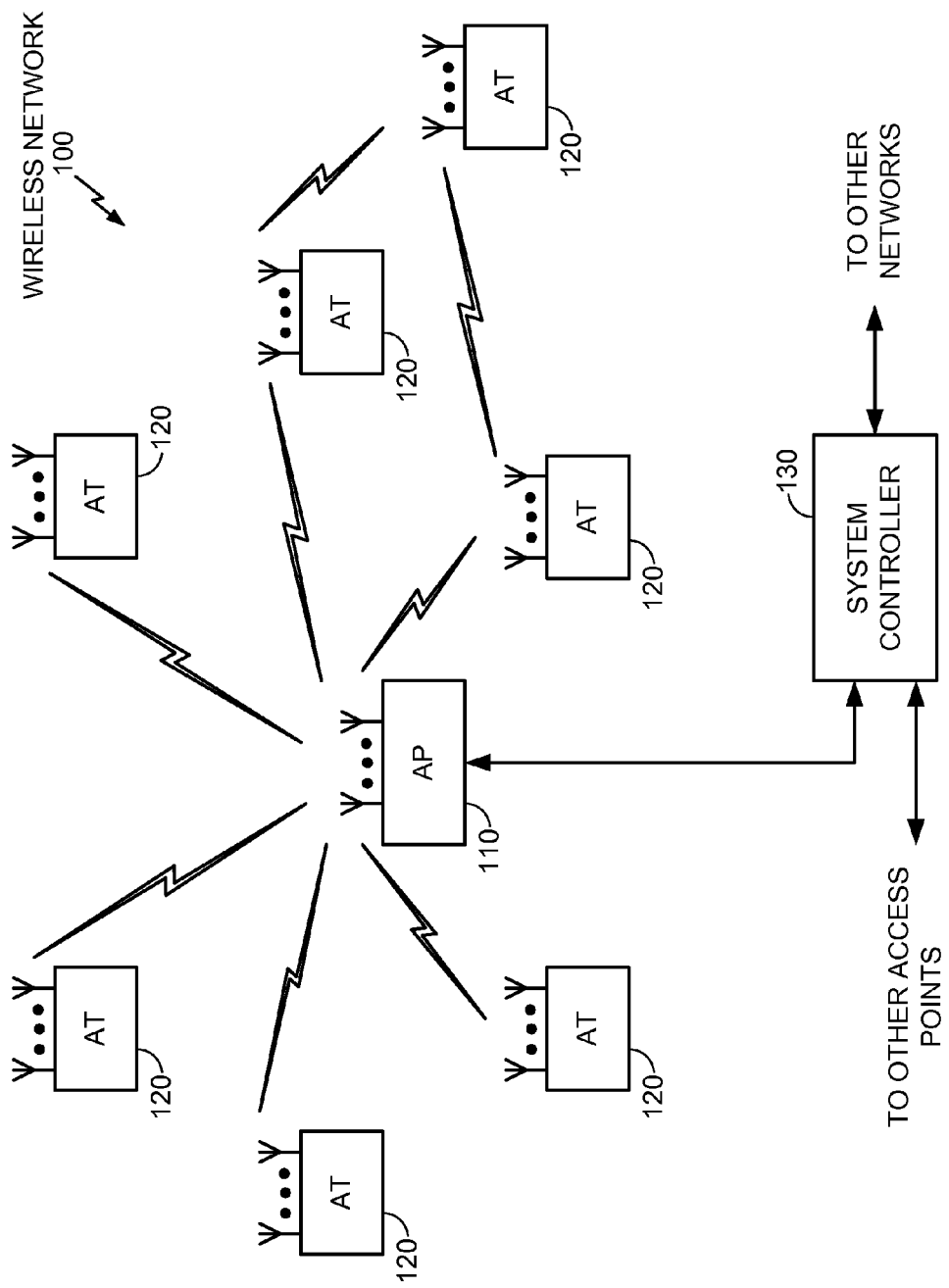
FIG. 1 shows a spatial division multiple access (SDMA) MIMO wireless system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as Node B, Radio Network Controller ("RNC"), eNode B, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Several aspects of a wireless network will now be presented with reference to FIG. 1. The wireless network 100, which is also referred to herein as a basic service set (BSS), is shown with several wireless nodes, generally designated as an access point 110 and a plurality of access terminals 120 or stations (STAs). Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal By way of example, an access point may be referred to as a base station, a base transceiver station, a station, a terminal, a node, a wireless node, an access terminal acting as an access point, or some other suitable terminology. An access terminal may be referred to as a user terminal (UT), a mobile station (MS), a subscriber station, a station (STA), a wireless device, a terminal, a node, a wireless node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "precoding" is used herein, in general, the term "coding" may also be used to encompass the process of precoding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

Figure 2:
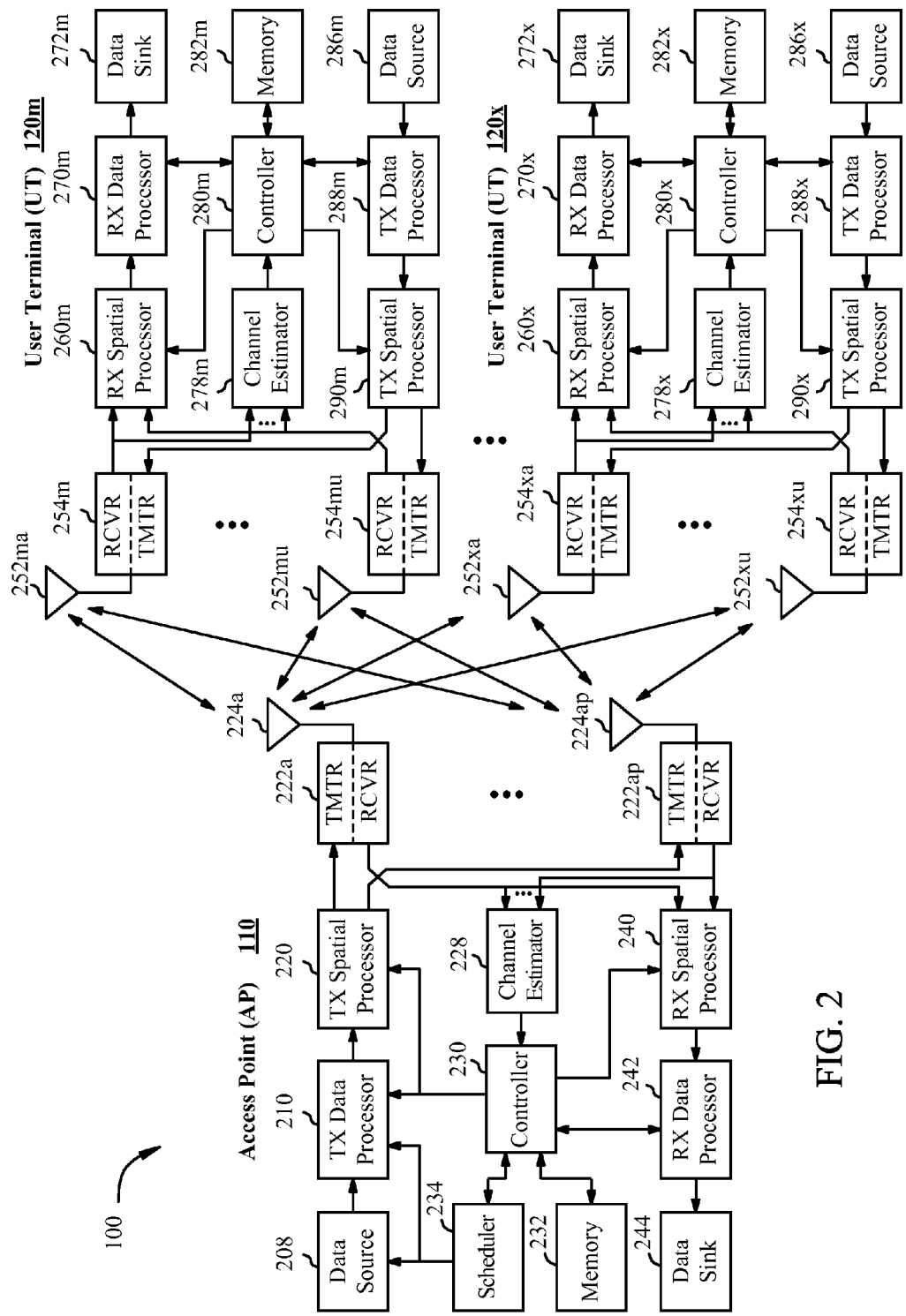
FIG. 2 illustrates a block diagram of an example access point and user terminals in accordance with certain aspects of the present disclosure.

FIG. 2 illustrates a block diagram of access point 110 and two access terminals 120m and 120x in the wireless network 100, which may comprise a MIMO system. The access point 110 is equipped with $N_t$ antennas 224a through 224t. Access terminal 120m is equipped with $N_{ut,m}$ antennas 252ma through 252mu, and access terminal 120x is equipped with $N_{ut,x}$ antennas 252xa through 252xu. The access point 110 is a transmitting entity for the downlink and a receiving entity for the uplink. Each access terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each access terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, de-interleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each access terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, de-interleaves and decodes) the recovered downlink data symbol stream to obtain decoded data for the user terminal.

At each access terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and access terminal 120, respectively.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

The following is a list of acronyms used throughout this disclosure:

A-MPDU . . . Aggregated Media Access Control Protocol Data Unit
AC . . . Access Category
AID . . . Association Identifier
AIFS . . . Arbitration Interframe Space
AP . . . Access Point
APID . . . Access Point Identifier
BA . . . Block Ack
BAR . . . Block Ack Request
BSS . . . Basic Service Set
C . . . Control
CF-End . . . Contention Free End CSI . . . Channel State Information
CTS . . . Clear to Send
CW . . . Contention Window
DA . . . Destination Address
DIFS . . . Distributed Coordination Function Interframe Space
DSC . . . Deterministic Slot Count
EDCA . . . Enhanced Distributed Channel Access
FCS . . . Frame Check Sequence
GST . . . Guaranteed Start Time
L-SIG . . . Legacy Signal field
MAC . . . Media Access Control
MCS . . . Modulation Coding Scheme
MIMO . . . Multiple Input Multiple Output
MU . . . Multi-User
NAV . . . Network Allocation Vector
Nsts . . . Number of Space Time Streams
OFDM . . . Orthogonal Frequency Division Modulation
OFDMA . . . Orthogonal Frequency Division Multiple Access
PHY . . . Physical Layer
PIFS . . . Point Coordination Function Interframe Space
SDMA . . . Spatial-Division Multiple Access
SIFS . . . Short Interframe Space
SIG . . . Signal
STA . . . Station
SU . . . Single User
TCP . . . Transmission Control Protocol
TDLS . . . Tunneled Direct Link Setup
TXOP . . . Transmit Opportunity
VSL . . . Very Short Slot
WLAN . . . Wireless Local Area Network The references IEEE 802.11-2007 and IEEE 802.11n-2009 provide additional information and are incorporated by reference herein in their entirety.

A problem in IEEE 802.11 Wireless LAN (WLAN) is how to efficiently organize response transmit opportunities (TX-OPs) from several receivers. The receivers may have received downlink data in parallel through Spatial-Division Multiple Access (SDMA) or Orthogonal Frequency Division Multiple Access (OFDMA), after which they need to respond with a BA frame, possibly with other uplink traffic. SDMA is also referred to as Multi-User Multiple Input Multiple Output (MU-MIMO). OFDMA is also referred to as multi-user Orthogonal Frequency Division Modulation (OFDM).

Prior solutions to this problem have relied on providing the addressed stations with a specified time slot after the downlink transmission, but this may have potential drawbacks. As an example, the AP does not know the optimal length of the slot, because the uplink PHY rate and the amount of data are unknown. As another example, when the time slot information is not received by the station, then the time slot is wasted. The PHY rate could be specified by the AP, but this would typically result in a too conservative estimate and therefore too long response slots.

A solution for this problem is to provide the addressed receivers with a deterministic backoff, for instance through a Deterministic Slot Count (DSC) field which is embedded in a downlink transmission. Each addressed station is assigned an individual backoff count when the downlink SDMA A-MPDU is sent by the AP. The deterministic slot count is counted down by the addressed receivers after receipt of the downlink transmission containing the DSC field, which results in an array of uplink transmissions separated by AIFS+1 slot when normal EDCA backoff is used. Each station sends its response when its DSC reaches zero. In this way, each station contends for the channel using a conventional contention protocol, but according to the assigned deterministic backoff counts. (By contrast, in conventional contention, a station chooses a backoff count randomly.) In certain aspects EDCA may be modified so that AIFS also counts as a slot, allowing the separation 350 between return frames to be reduced to PIFS as illustrated in FIG. 3.

Figure 3:
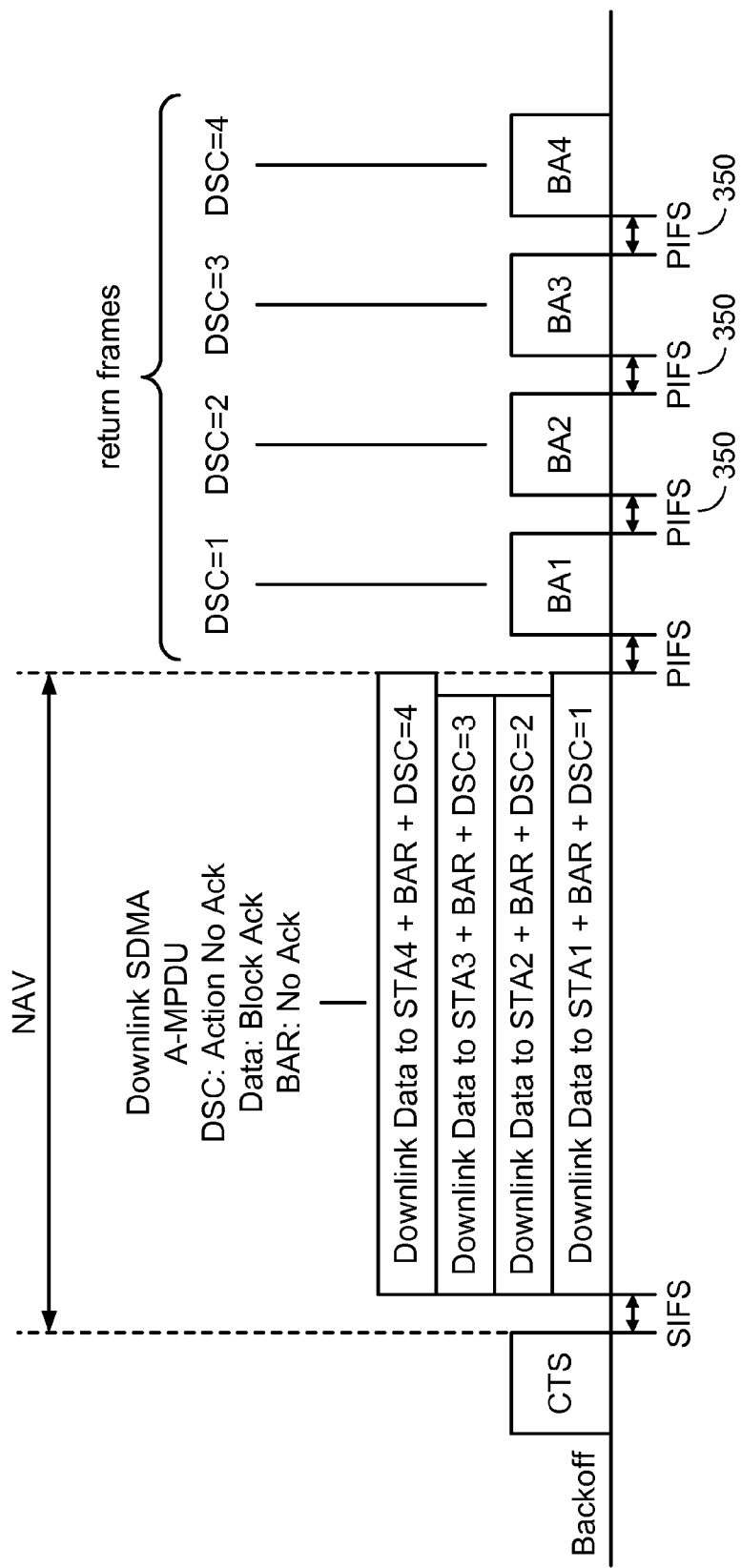
FIG. 3 illustrates a downlink SDMA transmission with return transmit opportunities (TXOPs) through a deterministic backoff with a modified EDCA such that AIFS is counted as a slot.

The frame exchange sequence in FIG. 3 starts with a CTS that sets a NAV for the duration of the longest downlink SDMA TXOP. The downlink SDMA TXOP contains downlink Data for STA1-STA4, including possible control frames. A BAR frame is included in the A-MPDU to request a Block Ack. The DSC frame (or element) indicates the slot count for the return TXOP. The DSC field may be carried inside a generic control frame (C-frame). The Ack policy on the downlink frames is such that no SIFS response is elicited (the Ack policy on the downlink Data is set to Block Ack, the Ack policy on the BAR is set to No Ack, and the Ack policy on the DSC frame is set to No Ack).

Deterministic backoff refers to providing each addressed station a predetermined slot count for the backoff of its return TXOP.

Figure 4:
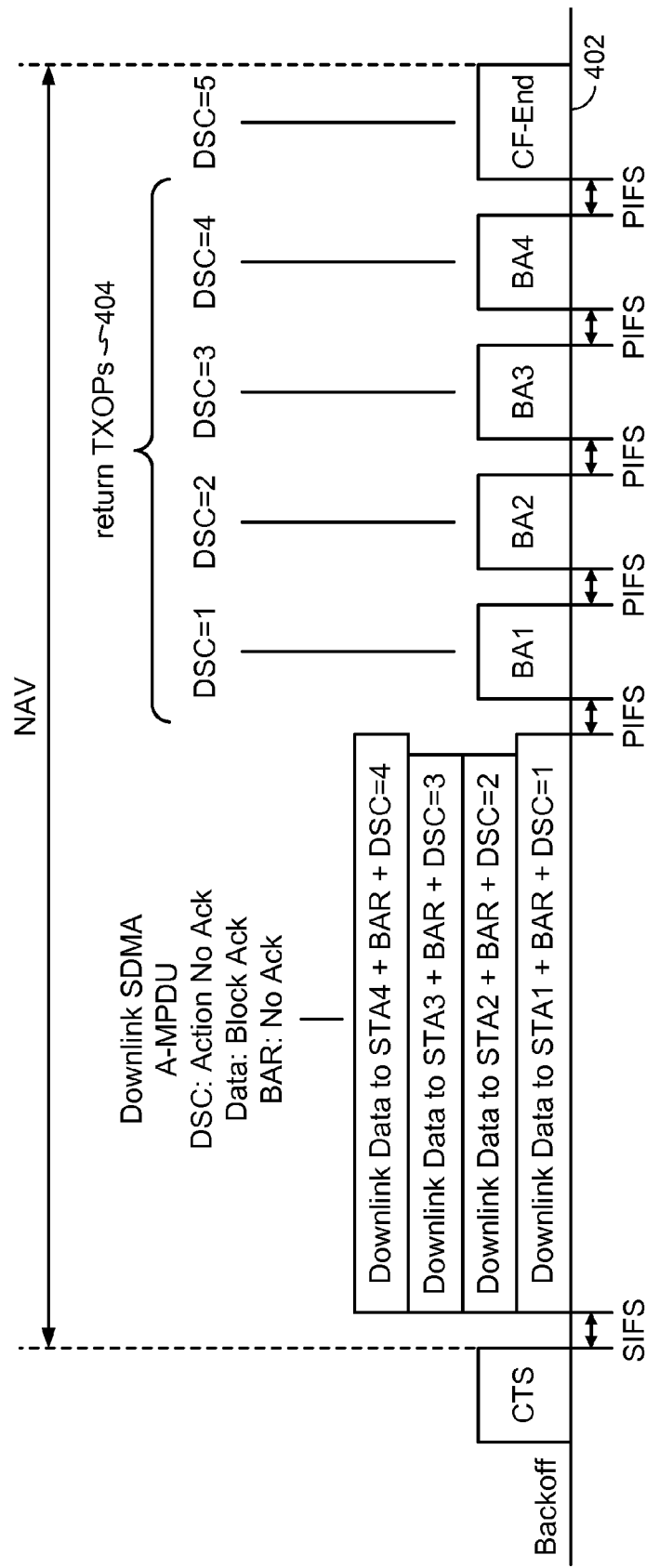
FIG. 4 illustrates a downlink SDMA transmission with return TXOPs through a deterministic backoff where the DSC functions as an implicit CF-End to truncate the NAV.

In certain aspects, the presence of a DSC field may function as an implicit CF-End, which terminates a NAV for the addressed station receiving the DSC field. The NAV may be set by a CTS prior to the SDMA transmission for a duration that significantly exceeds the longest downlink transmission. Truncating the NAV only for the addressed stations (by means of the DSC field) provides the addressed stations with priority access over other contenders (or stations) that were not addressed in the SDMA transmission and that did not receive a DSC field. After the uplink TXOPs, the overall NAV may be truncated through a CF-End frame. As illustrated in FIG. 4, a CF-End frame 402 may be scheduled at the end of the uplink return TXOPs by providing it a deterministic slot count equal to the number of return TXOPs 404 plus one.

The frame exchange sequence in FIG. 4 starts with a CTS which sets a NAV for a duration that exceeds the duration of the downlink SDMA TXOP. The downlink SDMA TXOP contains downlink Data for STA1-STA4, including possible Control frames. The Ack policy on the downlink frames is such that no SIFS response is elicited. The Ack policy on the downlink Data is set to Block Ack. A BAR frame is included to request for a Block Ack. The Ack policy on the BAR is set to No Ack. The DSC frame (or element) indicates the slot count for the return TXOP. The Ack policy on the DSC frame is set to No Ack. The DSC truncates the NAV for the addressed STA. The DSC may include a minimum duration of the NAV, so that the backoff starts after the longest SDMA transmission.

Figure 5:
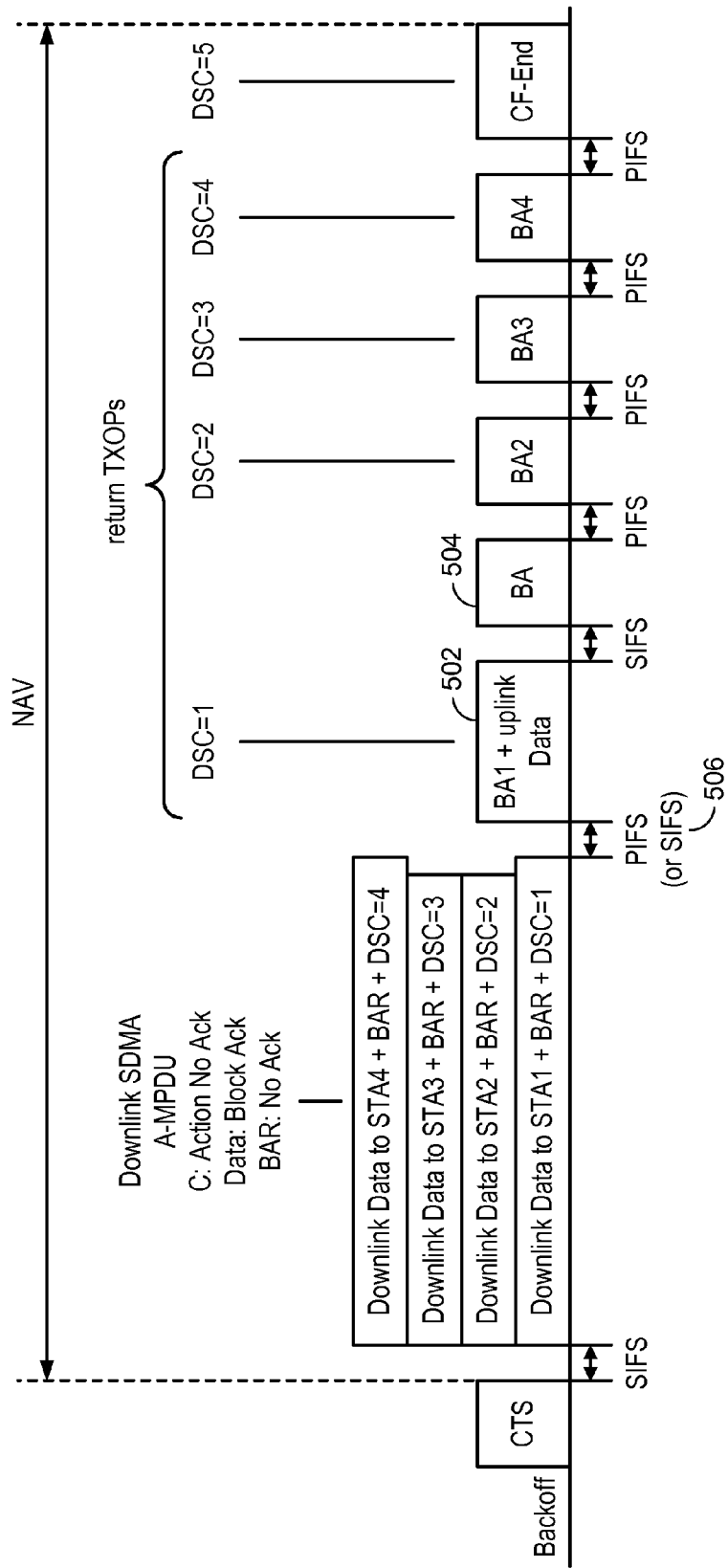
FIG. 5 illustrates a downlink SDMA transmission with return TXOPs through a deterministic backoff where the return TXOP may include Data multi-protocol data units (MPDUs), to which the AP may respond with a Block Ack.

In certain aspects, the uplink TXOPs do not need to be limited to response traffic only. Uplink Data may be included, for instance in the form of an A-MPDU 502, as illustrated in FIG. 5. The AP may transmit immediate feedback, such as a Block Ack 504, SIFS after the uplink A-MPDUI.

The sequence starts with a CTS that sets a NAV for a duration that exceeds the duration of the downlink SDMA TXOP. The downlink SDMA TXOP contains an A-MPDU containing downlink Data for STA1-STA4 and Control frames such as BAR and DSC. The Ack policy on the downlink frames is such that no SIFS response is elicited. The Ack policy on the downlink Data is set to Block Ack. A BAR frame is included to request for a Block Ack. The Ack policy on the BAR is set to No Ack. The DSC frame (or element) indicates the slot count for the return TXOP. The Ack policy on the DSC frame is set to No Ack. The DSC truncates the NAV for the addressed STA. The DSC may include a minimum duration of the NAV, so that the backoff starts after the longest SDMA transmission. STA1 receives a deterministic slot count of 1 slot, which it counts down during the first PIFS 506 occurring after the downlink SDMA transmission. STA1 transmits an A-MPDU 502 which contains a BA frame and uplink Data MPDUs. The uplink Data MPDUs may use the Implicit BAR Ack Policy. The AP responds SIFS after the uplink A-MPDU with the requested BA frame. STA2 then sends its response frame(s) PIFS after the downlink BA frame 504. STA3 then sends its response frame(s) PIFS after the STA2 response frame(s). Then STA4 sends its response frame(s) after the STA3 response frame(s).

Figure 6:
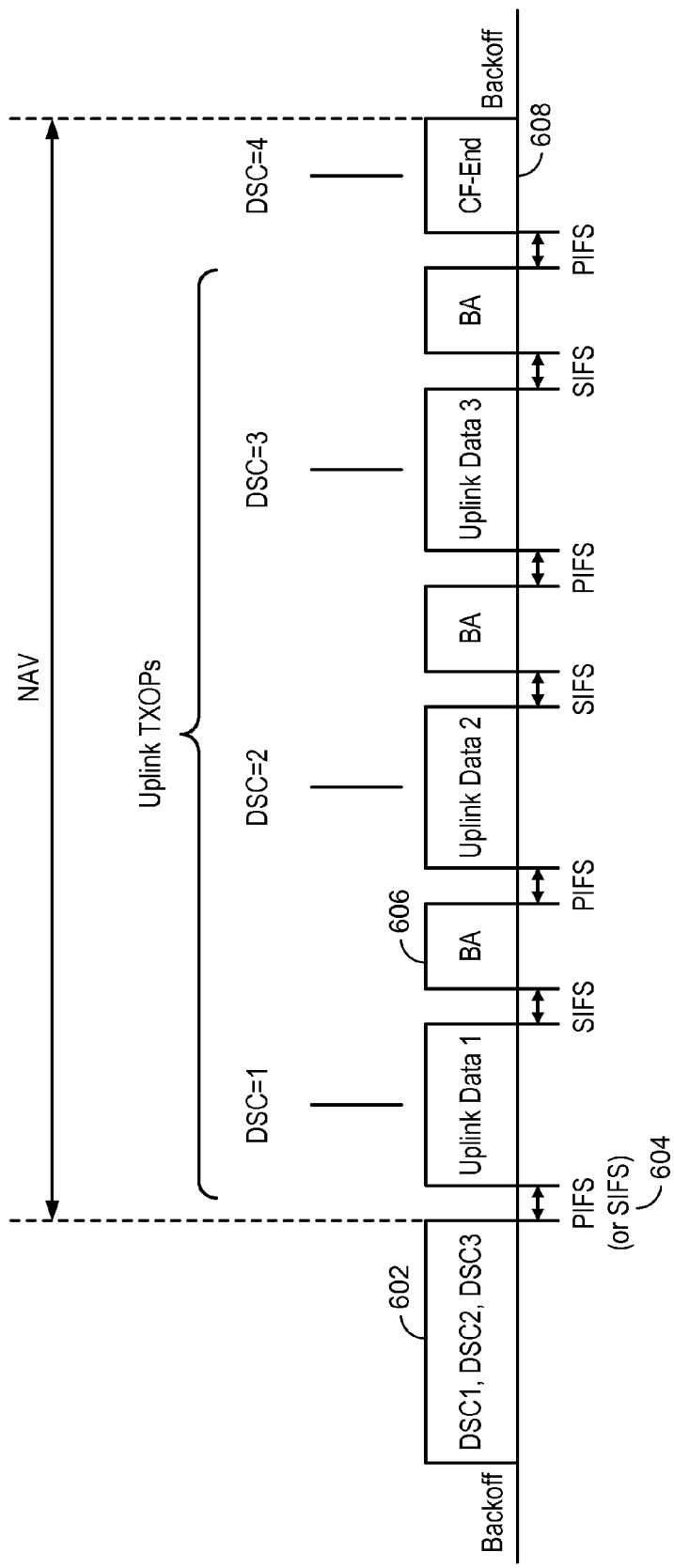
FIG. 6 illustrates a downlink SDMA exchange with deterministic backoff for return TXOPs.

In certain aspects return TXOPs through deterministic backoff may also be indicated through a non-SDMA frame 602 as illustrated in FIG. 6.

The downlink SDMA exchange sequence with deterministic backoff for return TXOPs starts with a DSC frame 602 that sets a long NAV. The DSC frame indicates a deterministic backoff for STA1-STA3. The DSC implicitly truncates the NAV for STA1-STA3 (or no NAV is set because the frame setting the NAV is a DSC frame). After a first empty backoff slot 604, STA1 transmits an uplink A-MPDU containing at least one Data MPDU. The Data MPDU has the implicit BAR Ack policy. The AP responds with a BA frame 606 SIFS after the end of the uplink transmission. A similar transmission pattern occurs for STA2 and STA3 as illustrated in FIG. 6. Finally, the AP responds with a CF-End frame 608 PIFS after the BA frame for STA3. This terminates the NAV for other stations not recipients of the DSC frame.

Return TXOPs through deterministic backoff may be made even more efficient when the SIFS time is reduced. This is possible without backwards compatibility issues when the return TXOP phase is not mixed with regular contention by setting a NAV that is truncated only for the addressed recipients of the DSC frame. Setting a NAV and selectively truncating it at a subset of the devices creates a situation in which only the selected subset of devices will perceive medium idle conditions during which a backoff can be counted down, while other devices will refrain from counting down their backoff because the virtual carrier sense (e.g., NAV) indicates that the medium is busy.

The AP may transmit DSC frames autonomously to streamline the contention process. When the AP observes that contention exceeds a certain threshold, it may start transmitting DSC frames to reduce the contention and improve the channel access efficiency. An exemplary threshold is 10% collision rate as experienced by the AP. The AP may use priority access to transmit DSC frames, but the AP must ensure that it periodically inserts enough empty backoff slots such that new nodes or nodes that are not included in the DSCs may access the channel too.

Deterministic Slot Count (DSC)

Deterministic slot count (DSC) generally refers to providing STAs with a deterministic slot count for a backoff that precedes a response TXOP by a STA. The response TXOP 702 can be used to transmit Control and/or Data frames (uplink or direct link), as illustrated in FIG. 7.

Figure 7:
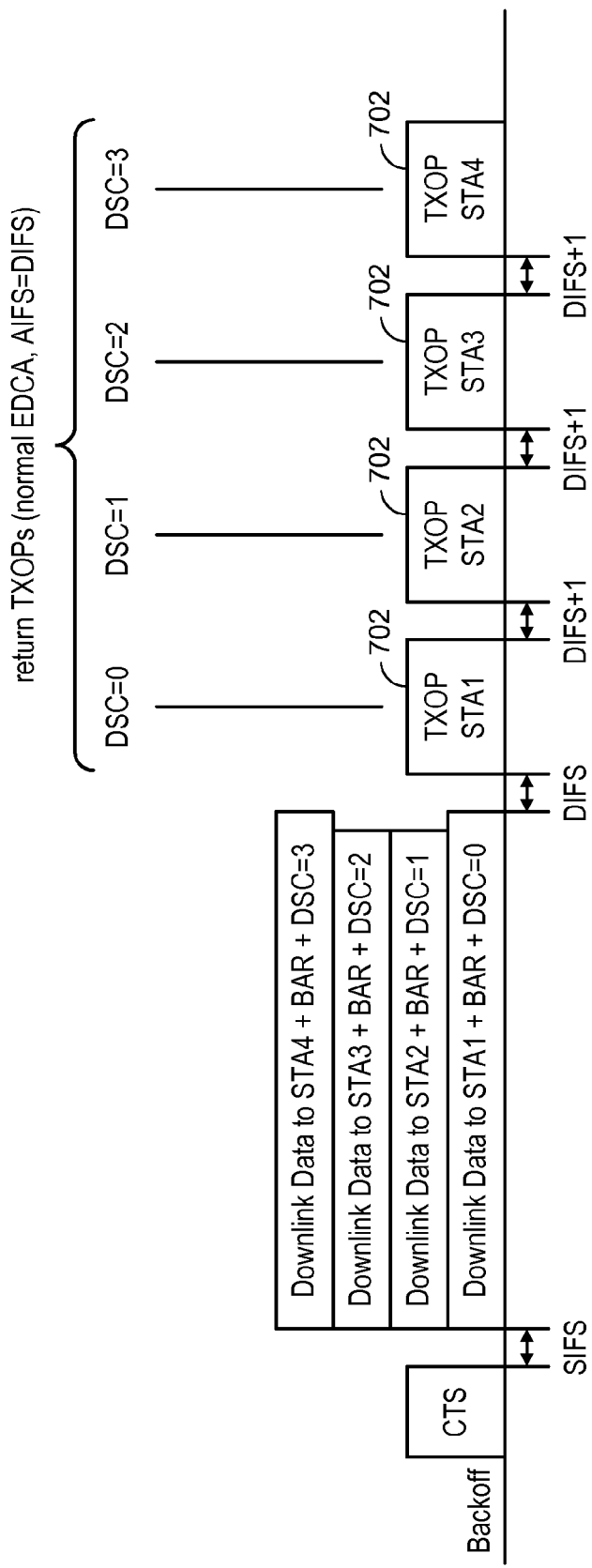
FIG. 7 illustrates a deterministic backoff using EDCA and AIFS equal to DIFS.

In certain aspects, as shown in FIG. 7, EDCA may be used with an AIFS equal to DIFS. STA1, which received a DSC of 0, will access the medium DIFS after the end of the downlink transmission containing the DSC. STA2, which received a DSC of 1, will access the medium DIFS+1 slot after the end of the TXOP started by STA1. STA3, which received a DSC of 2, will access the medium DIFS+1 slot after the TXOP started by STA2, etc. The difference in gap size for the first and later TXOPs is caused by the fact that AIFS is not counted as a backoff slot in regular EDCA. So only a backoff of 0 slots will result in a DIFS gap (or AIFS in general), any non-0 backoff will result in a gap of at least DIFS+1 slot (or AIFS+1 slot in general).

Figure 8:
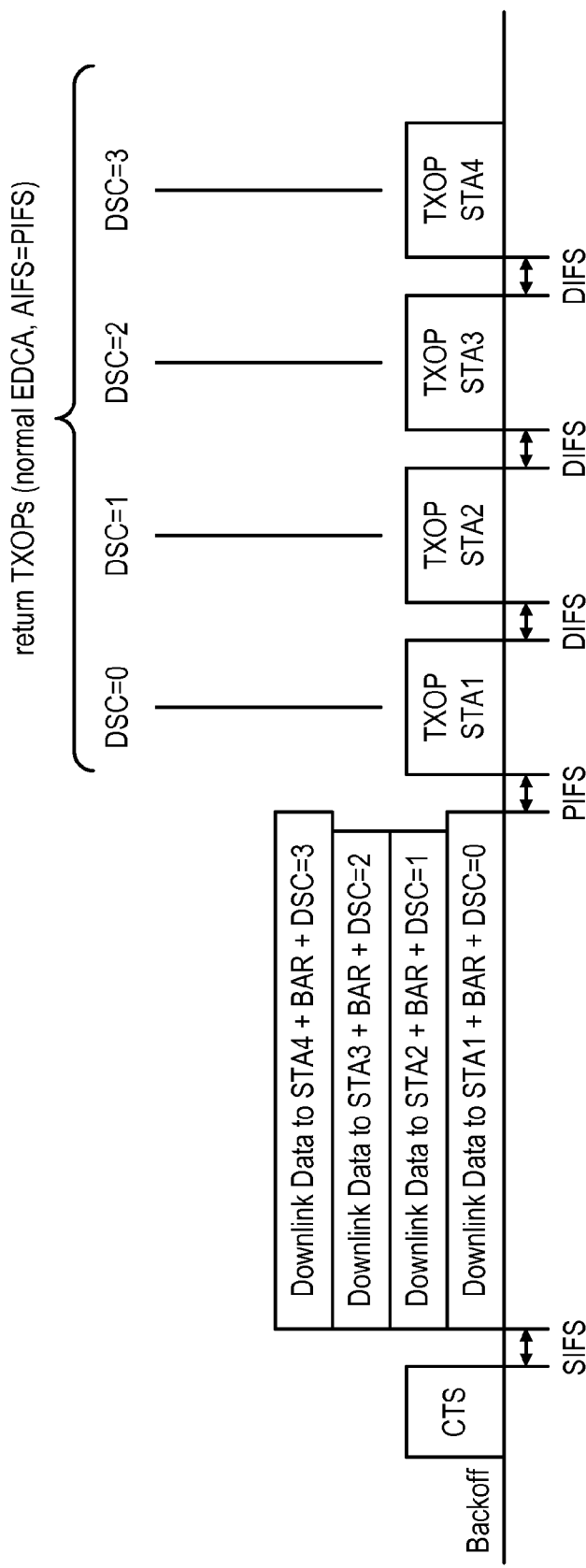
FIG. 8 illustrates a deterministic backoff using EDCA and AIFS equal to PIFS.

In certain aspects, as illustrated in FIG. 8, the gaps between return TXOPs can be reduced by 1 slot by setting AIFS equal to PIFS.

Figure 9:
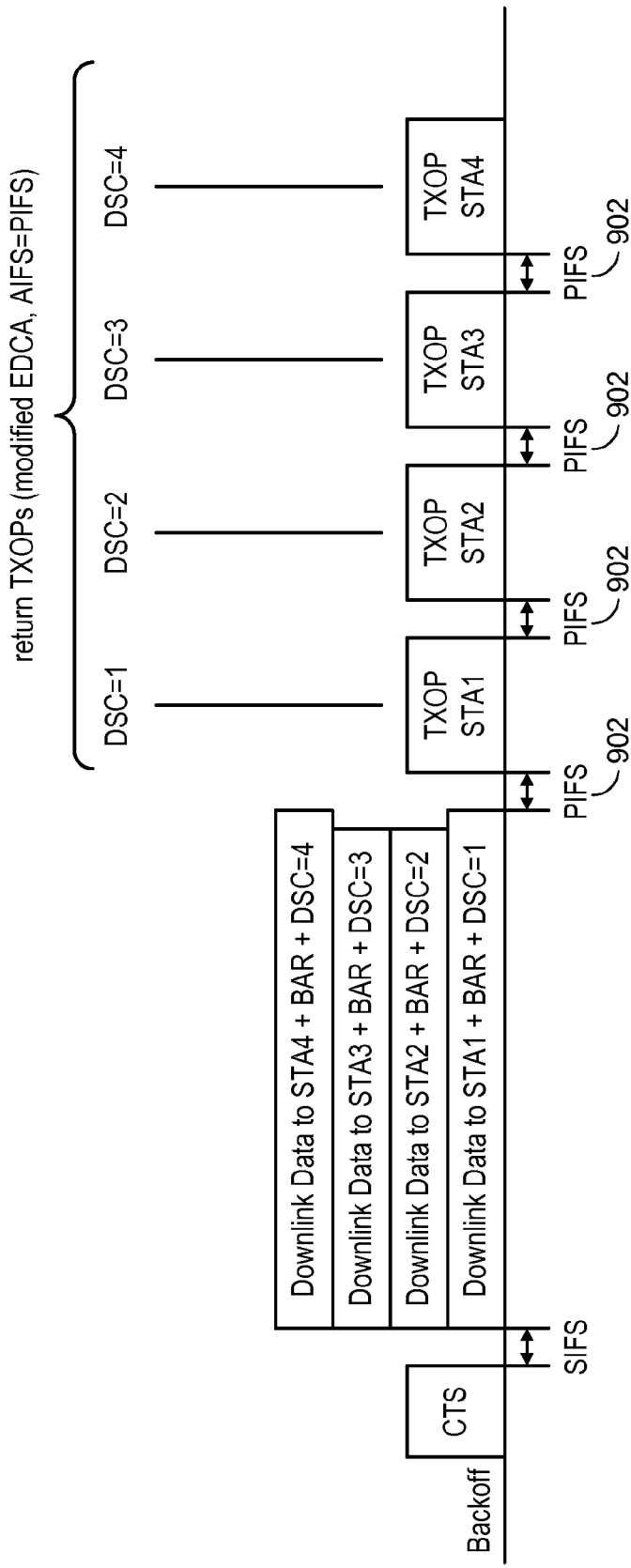
FIG. 9 illustrates a deterministic backoff using modified EDCA and AIFS equal to PIFS.

In order to have all gaps 902 the same duration, EDCA may be modified so that AIFS is counted as a backoff slot. This is illustrated in FIG. 9 for AIFS=PIFS. A backoff of 0 is no longer a valid backoff in this case, so the smallest DSC is 1.

Figure 10:
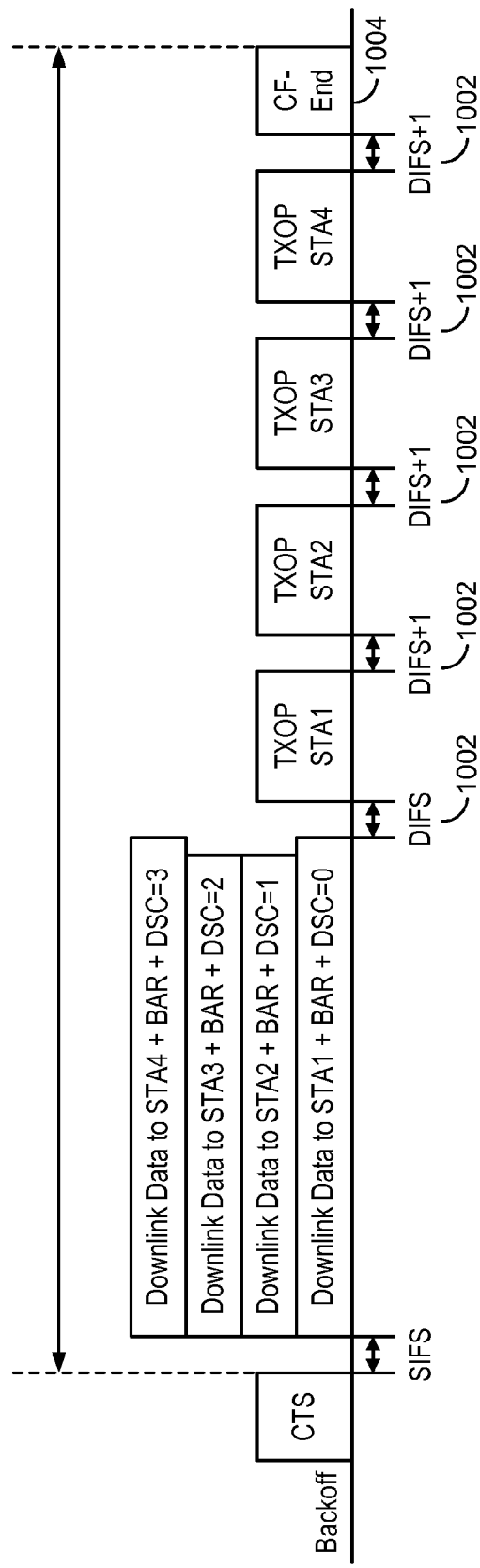
FIG. 10 illustrates a deterministic backoff with NAV protection.

PIFS gaps between the uplink TXOPs allow for priority access to the medium, so that NAV is not required to avoid collisions with other contenders which have to wait a longer period of time before accessing the medium. When the gaps 1002 are larger than PIFS, then a NAV is required, as illustrated in FIG. 10. The presence of a DSC field implicitly resets a NAV at the receiver of the field. The overall NAV is reset by a CF-End frame 1004 that is transmitted by the AP. The CF-End frame is scheduled for transmission at one slot after the longest DSC, so the CF-End has a DSC of 4 in this example.

Figure 11:
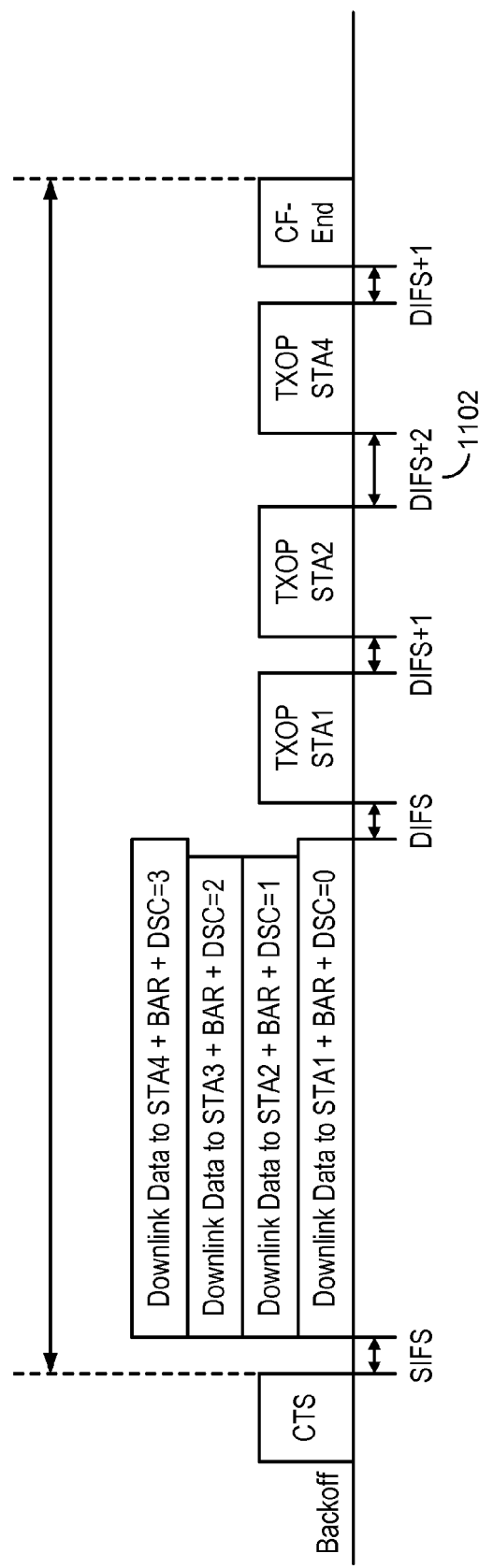
FIG. 11 illustrates a gap with one extra empty slot between the TXOP of STA2 and the TXOP of STA4, caused by STA3 not receiving its DSC.

When a TXOP does not occur because the STA did not receive the DSC or due to some other reason, there will be an additional empty slot as a result. This is illustrated in FIG. 11, where the gap 1102 between TXOP STA2 and TXOP STA4 has an additional empty slot.

To stay close to the EDCA model of traffic scheduling, the DSC could apply to a specific Access Category (AC), which could be the same as the AC of the downlink traffic or it could be the AC that would win the internal contention should the medium remain idle. Control traffic such as BA should be added to the return TXOPs.

To avoid that other internal queues (i.e., Access Categories) have a TXOP before the DSC AC does, the AIFS of the DSC AC may be assigned an AIFS equal to PIFS during the DSC backoff. When the DSC backoff expires, the AIFS is reset to the original value and contention follows the EDCA rules with the CW that was present before the DSC backoff.

When the AIFS of the DSC AC is set to PIFS, then the DSC ACs have priority on the medium and over the internal ACs (assuming that only APs use an AIFS that is equal to PIFS). This means that no CF-End is needed, but that the AP needs to correct the backoffs for internal ACs with AIFS=PIFS. The backoff for these ACs must be increased by the maximum DSC that is being handed out (in the above examples, the backoff(s) need to be incremented by 3). Correcting the internal backoffs avoids that the AP ACs interfere with DSC TXOPs from the STAs. If STAs also use AIFS equal to PIFS then they need to increment those backoffs also. To this end, the highest DSC needs to be included in the DSC frame (next to the actual DSC that is being handed out to the STA).

The fact that the AP had a successful TXOP indicates that there is no backoff equal to 0 in the system. Because if there is, then it would have caused a collision, but since there was no collision, there can be no backoff equal to 0 in the system. Therefore, none of the PIFS/DIFS gaps will cause a pending backoff to be decremented (assuming the AP is the only system in the network that uses PIFS).

This all works out well, unless another AP uses PIFS AIFS on the same channel. In that case, NAV with selective reset and a CF-End will have to be used as described above. However, the AP still has to add the maximum DSC to its own ACs that use PIFS AIFS, because the AP internally does not set a NAV as the transmitter of the CTS frame.

When the return traffic is restricted to only a BA frame (or to one PHY Protocol Data Unit (PPDU) in general), then the deterministic slot count (DSC) can be interpreted to refer to the BA slot i at which the STA may transmit its BA. The STA counts the number of frames after the end of the downlink SDMA transmission, and after i leading frames (i.e., frames from prior STAs), the STA sends its BA frame. This is illustrated in FIG. 12.

The interval 1202 between the uplink BA frames can be as short as SIFS in this case, or even shorter as permitted by the agreed-upon Rx-to-Tx turnaround time at the STAs. The index i may be derived implicitly from the order at which the device identifier occurs in the downlink SDMA transmission. Setting a NAV is not needed, because no gaps will occur that are long enough for other devices to count down a backoff.

Figure 12:
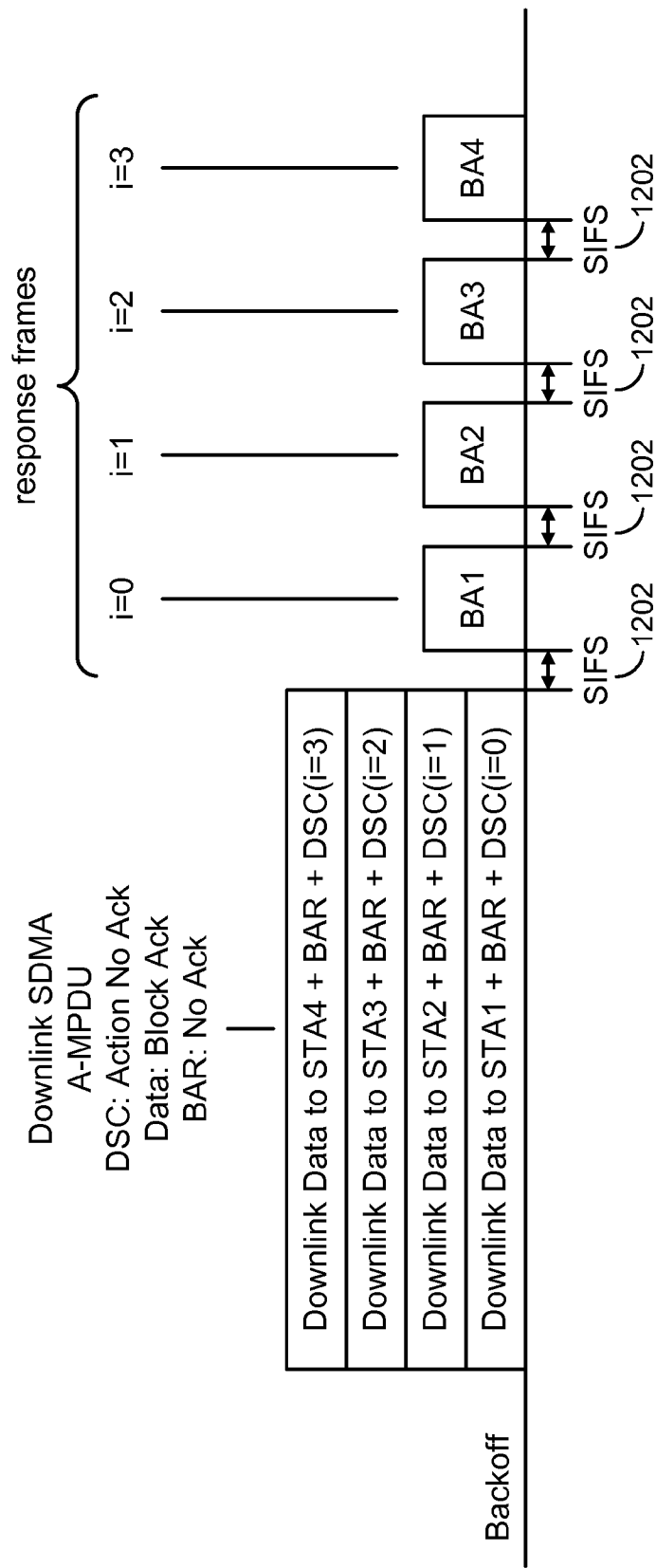
FIG. 12 illustrates a downlink SDMA transmission with slotted uplink BAs.

The frame exchange sequence, as illustrated in FIG. 12, may start with a CTS (not shown) that may set a NAV for the duration of the longest downlink SDMA TXOP. Setting a NAV is not strictly necessary because the duration of the downlink transmissions is advertised in the PHY header of the downlink SDMA transmission, and no gaps may occur during the entire sequence. The downlink SDMA TXOP may contain downlink data for STA1 through STA4, including possible control frames. A BAR frame may be included in the A-MPDU, to request for a BA frame to be returned after the SDMA transmission. The DSC frame (or element) indicates to each STA the slot count for transmitting the BA. The Ack policy on the downlink frames is such that no SIFS response is elicited, possibly with the exception of downlink frames that are sent to the STA that is intended to transmit the first BA. The Ack policy on the downlink Data MPDUs may be set to Block Ack, the Ack policy on the BAR MPDU may be set to No Ack, and the Ack policy on the DSC frame may be set to No Ack.

One or more STAs may not receive one or more leading transmissions, or a leading transmission may not be present at all, for instance when the STA that should have sent it did not receive the DSC. To recover from such an event, in certain aspects, the AP may provide to each STA a time at which the transmission of the BA may begin, irrespective of the number of prior frames received by the STA. The receipt of a frame in this context may be defined as the correct receipt of a Legacy SIGNAL (L-SIG) field. The receipt of a frame in this context may be defined as the correct receipt of a PHY header. This time may be referred to as a guaranteed start time (GST). The guaranteed start time may also be derived at the STAs based on the assigned DSC in combination with a known maximum duration of the BA frames. The maximum duration may be included as part of the DSC information, or it may have been distributed by the AP through other means.

Figure 13:
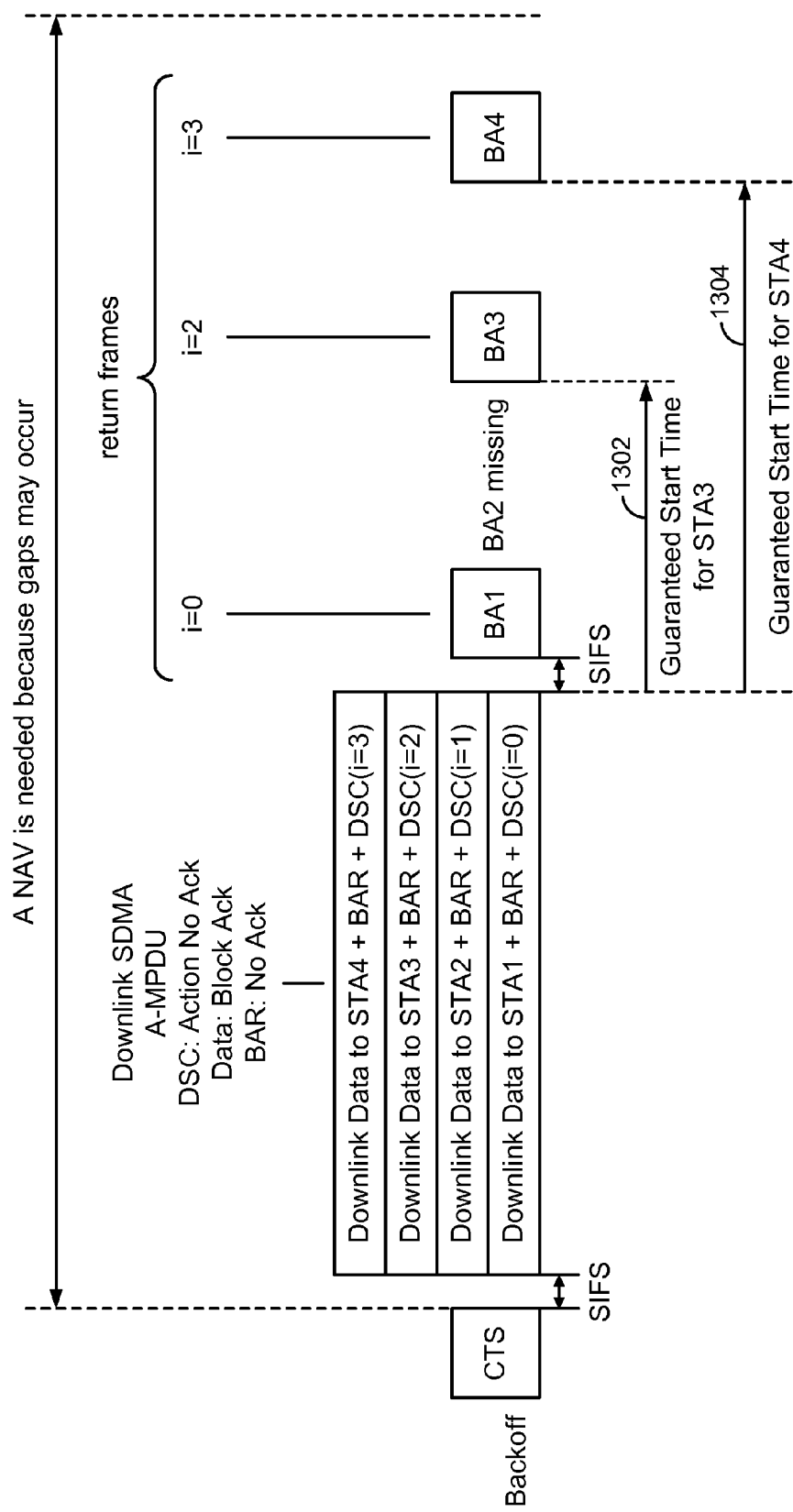
FIG. 13 illustrates the use of a guaranteed start time to ensure that the trailing STAs will recover when a leading frame is not received.
Figure 14:
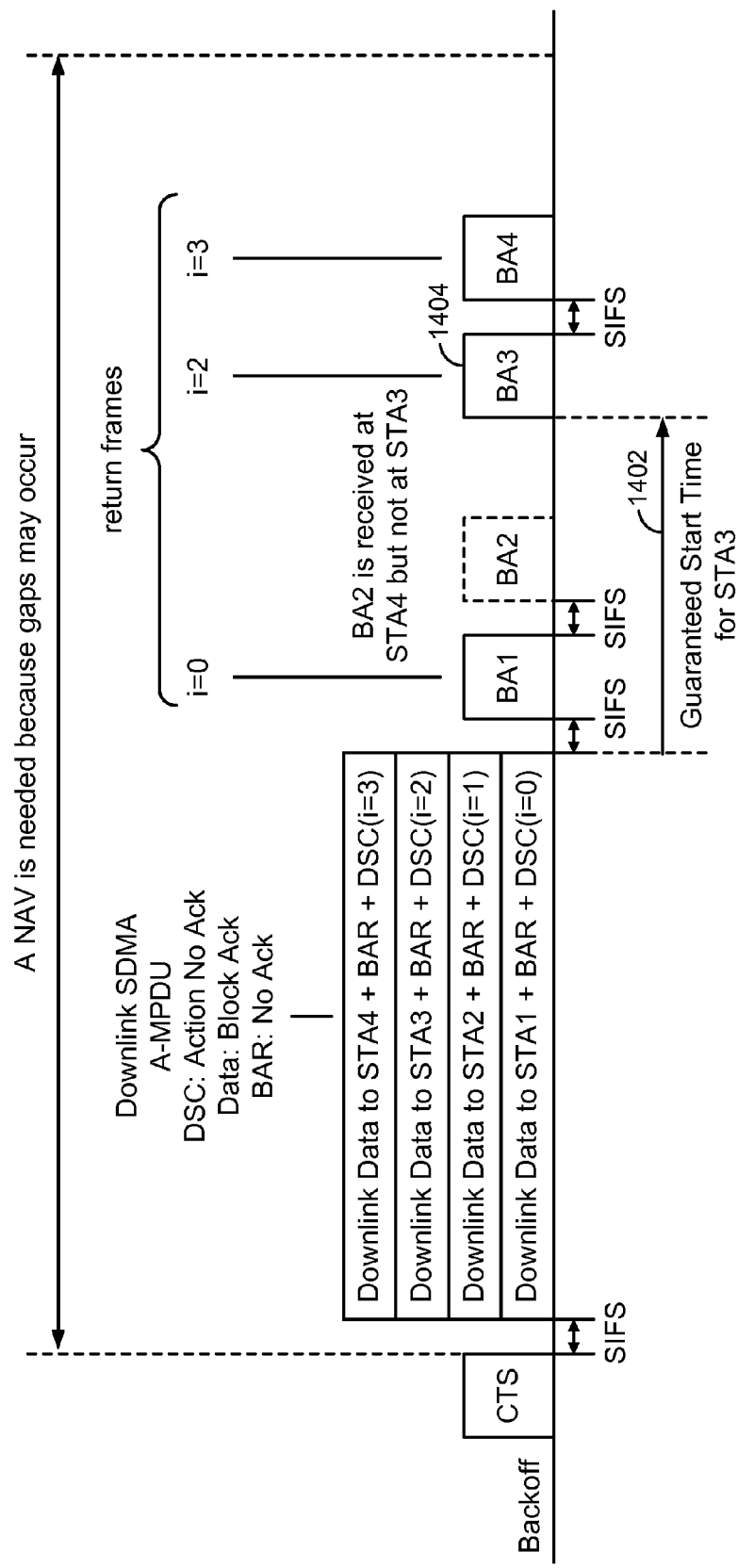
FIG. 14 illustrates a situation where only a subset of STAs that did not receive all of the leading transmissions will transmit at their guaranteed start time, in this case STA3.

A STA that did not receive one or more leading frames will transmit its BA at its guaranteed start time 1302, 1304, as shown in FIG. 13. If a leading frame is not received by only a subset of the addressed STAs, then only the addressed STAs in that subset will transmit at their guaranteed start time 1402, while other addressed STAs (which did receive all of the leading frames) will transmit SIFS after their leading frame. This is illustrated in FIG. 14, where STA3 did not receive the frame from STA2 (BA2), but STA4 did receive it. Hence, STA3 transmits at its guaranteed start time, while STA4 transmits SIFS after the transmission 1404 from STA3 (BA3).

Figure 15:
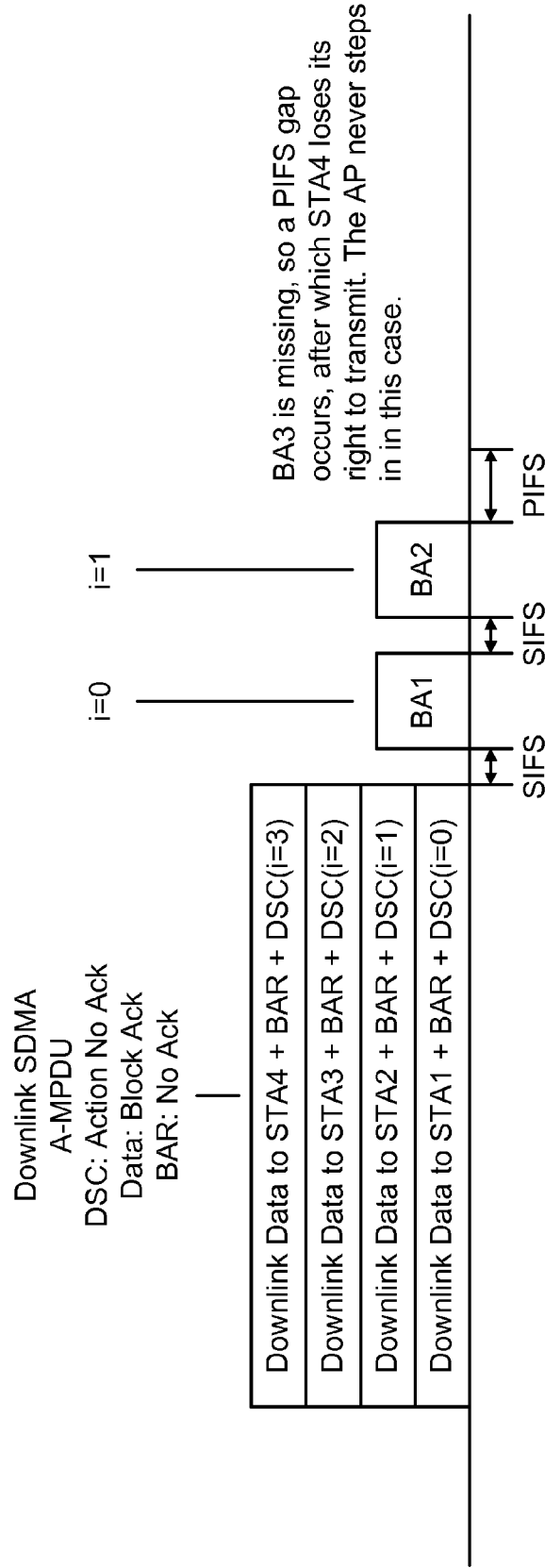
FIG. 15 illustrates a situation of the TXOP chain breaking when there is no fallback mechanism in the case of a missing frame resulting in subsequent STAs losing their right to transmit when a gap larger than PIFS occurs in the TXOP transmission chain.

Alternatively, in certain aspects, there could be no fall-back mechanism in case of a missing frame, combined with a rule that subsequent STAs lose their right to transmit when a gap occurs that is larger than PIFS (PIFS is equal to a SIFS duration plus a slot time). This is illustrated in FIG. 15, where BA3 is missing causing a gap after which STA4 loses its right to transmit.

In certain aspects, when a gap occurs, the AP may send a BAR frame to the STAs in the chain that did not respond, or the AP may continue sending downlink traffic and expect the missing STAs to transmit their BA in a subsequent BA chain. To increase the probability that a STA transmits its BA, the AP may modify the order of the STAs in the chain.

Figure 16:
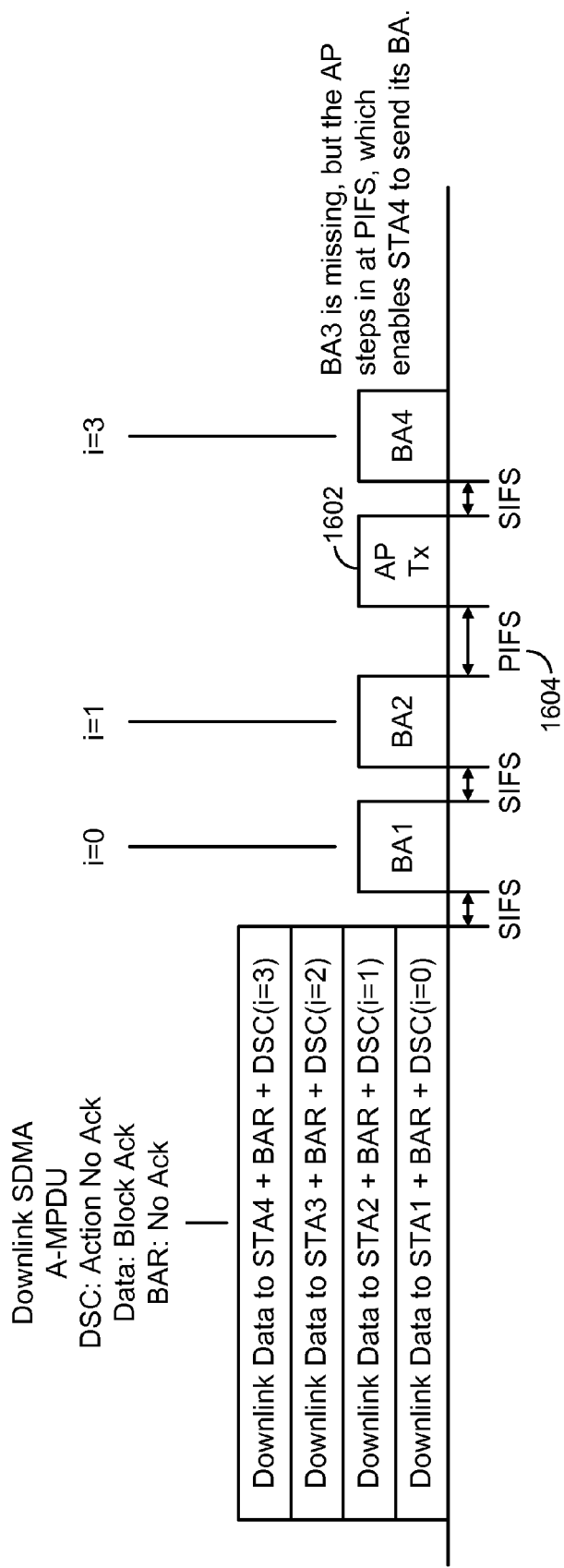
FIG. 16 illustrates the AP stepping in at PIFS to avoid breaking the TXOP transmission chain.

Alternatively, in certain aspects, the AP may step in with a short transmission 1602 when a gap 1604 occurs that is equal to PIFS, to avoid the chain from breaking, as illustrated in FIG. 16.

The short transmission 1602 could be an ACK frame addressed at the AP. Subsequent STAs in the chain will still transmit in this case. A rule may be added that STAs lose their right to transmit when a gap equal to DIFS occurs.

Each of the mentioned intervals could be different intervals. For instance, the SIFS interval could be a shorter interval, because STAs in the sequence may start the Rx to Tx turnaround during the data portion of the preceding frame (or at any time after receiving a valid signal field of a preceding PHY header).

Figure 17:
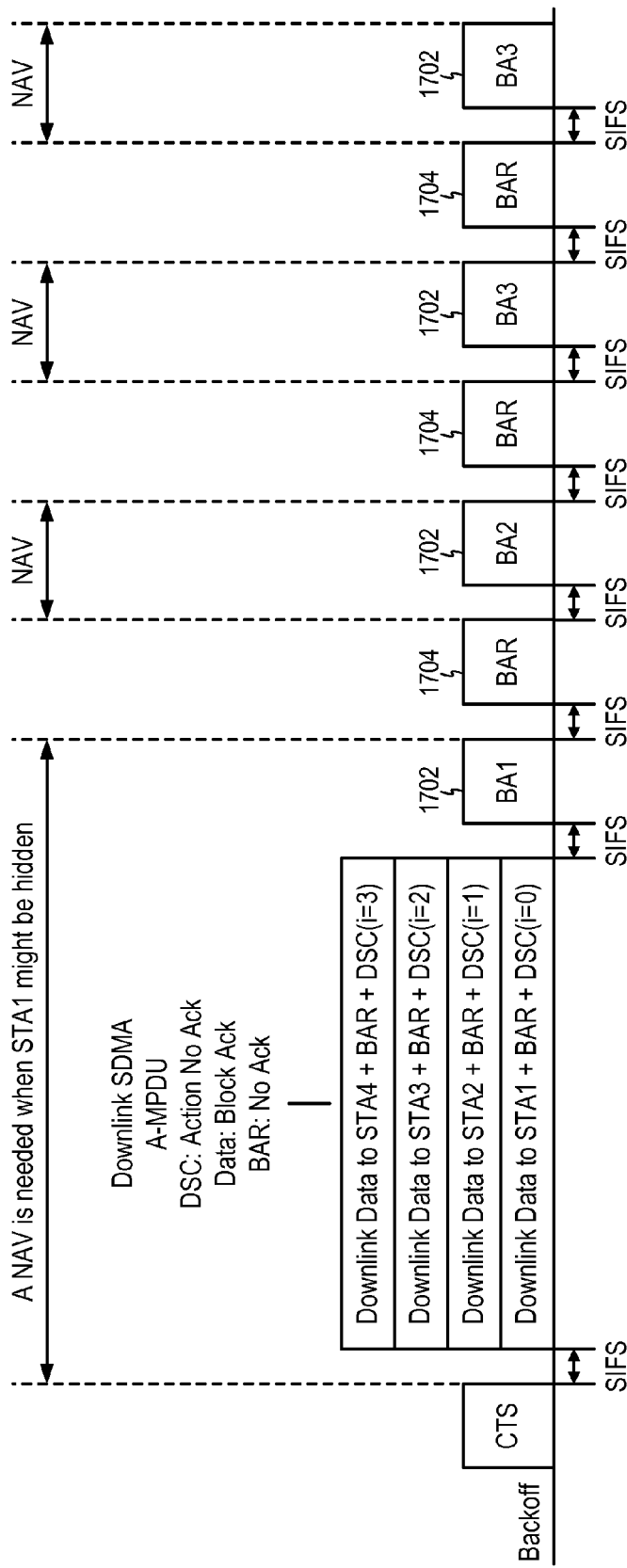
FIG. 17 shows an exemplary illustration of polling for BA.

For illustrative purposes, FIG. 17 illustrates a polled scenario, in which each BA frame 1702 is solicited by the AP by sending a BAR 1704 frame.

Figure 18:
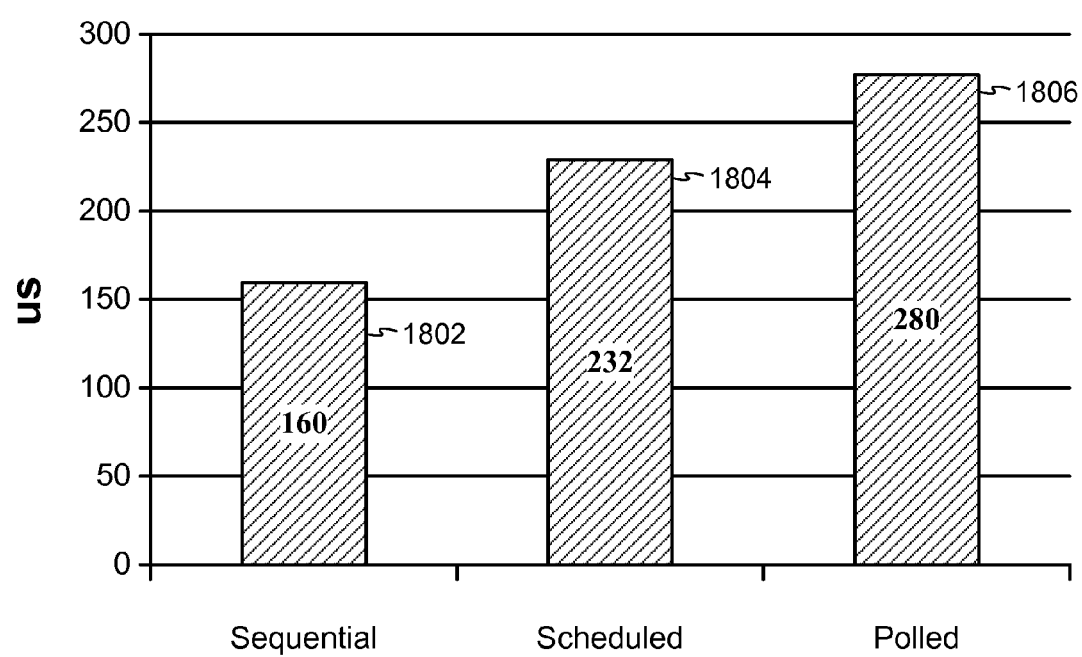
FIG. 18 provides a comparison between Sequential ACK, Scheduled ACK and Polled ACK for 4 BAs at 65 Mbps.

A comparison between Sequential ACK 1802, Scheduled ACK 1804, and Polled ACK 1806 is shown in FIG. 18. With Polled ACK, the AP polls for each BA frame individually by sending a BAR frame. This method has the highest overhead as shown in FIG. 18. With Scheduled ACK, the AP schedules fixed time slots during which the response frames can be transmitted. As shown in FIG. 18, the overhead of Scheduled ACK is lower than that of Polled ACK, but still higher than Sequential ACK.

The difference in overhead between Sequential ACK and Scheduled ACK will increase when data can be aggregated to the BA frames, using A-MPDU. To avoid the response frames becoming too long, a length limit may be imposed on the response A-MPDU. The length limit may be expressed in terms of bits or time. In particular, it may be interesting to aggregate TCP Ack frames to the response frame.

The AP may transmit a response frame in response to the received response A-MPDU. In this case, STAs must count double the number of frames prior to their slot (2×i).

Figure 19:
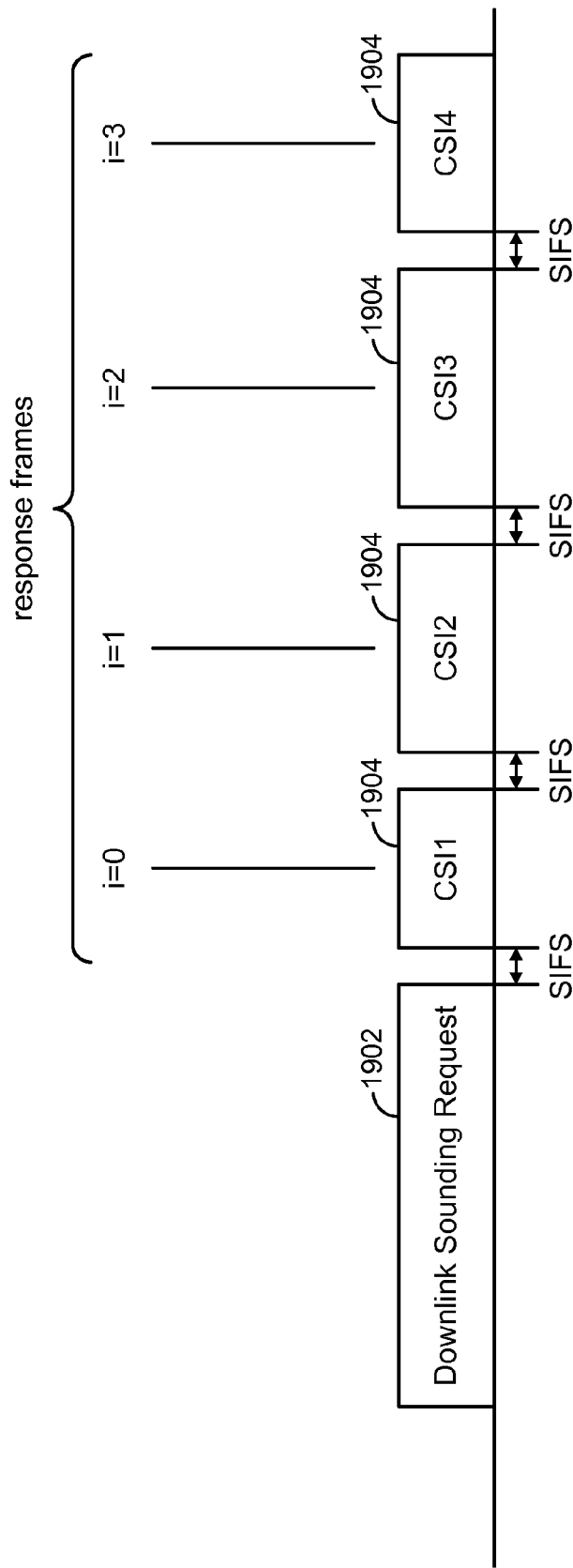
FIG. 19 illustrates a sounding request followed by sequential CSI frames.

Sequential ACK can be used in a variety of protocols where a single downlink transmission by an AP is responded to by transmissions from several STAs. For example, referring to FIG. 19, the downlink transmission by the AP might be a sounding request frame 1902. The uplink response frames may be sounding response frames 1904. These response frames may contain channel state information (CSI).

Figure 20:
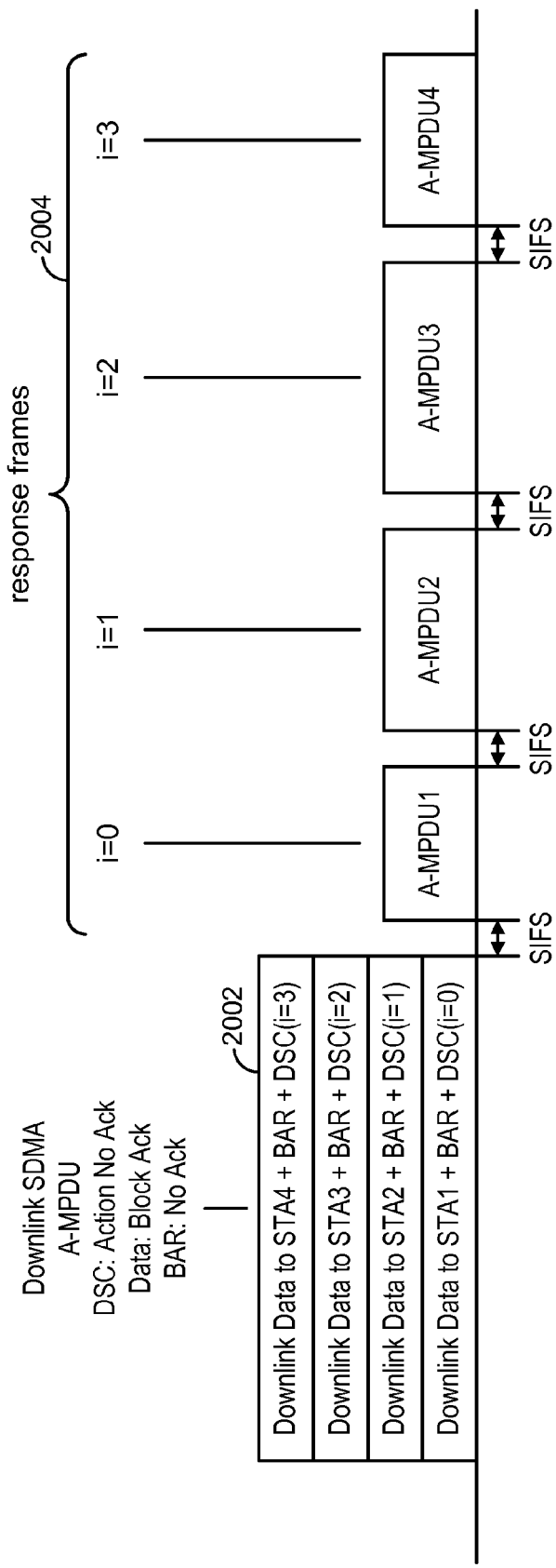
FIG. 20 illustrates a broadcast or parallel transmission may be followed by several response A-MPDUs, in a sequential manner.

In general, sequential ACK can be used in cases where one transmission 2002 (broadcast or parallel) is followed by several response transmissions 2004 from different STAs. This is illustrated in FIG. 20.

Figure 21:
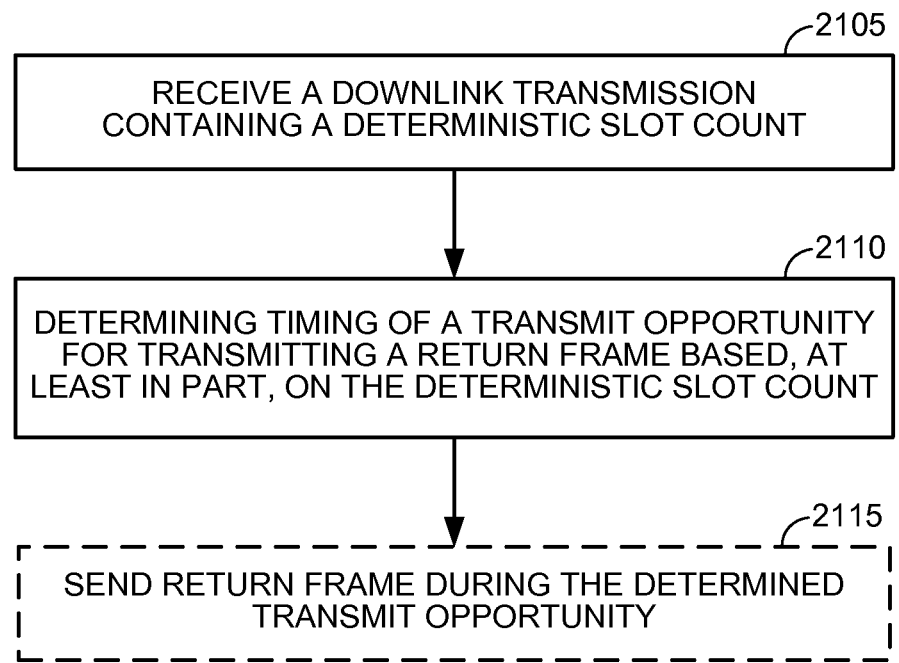
FIGS. 21 and 21A illustrate example operations for receiving a downlink transmission with a deterministic slot count, in accordance with certain aspects of the present disclosure.
Figure 21A:
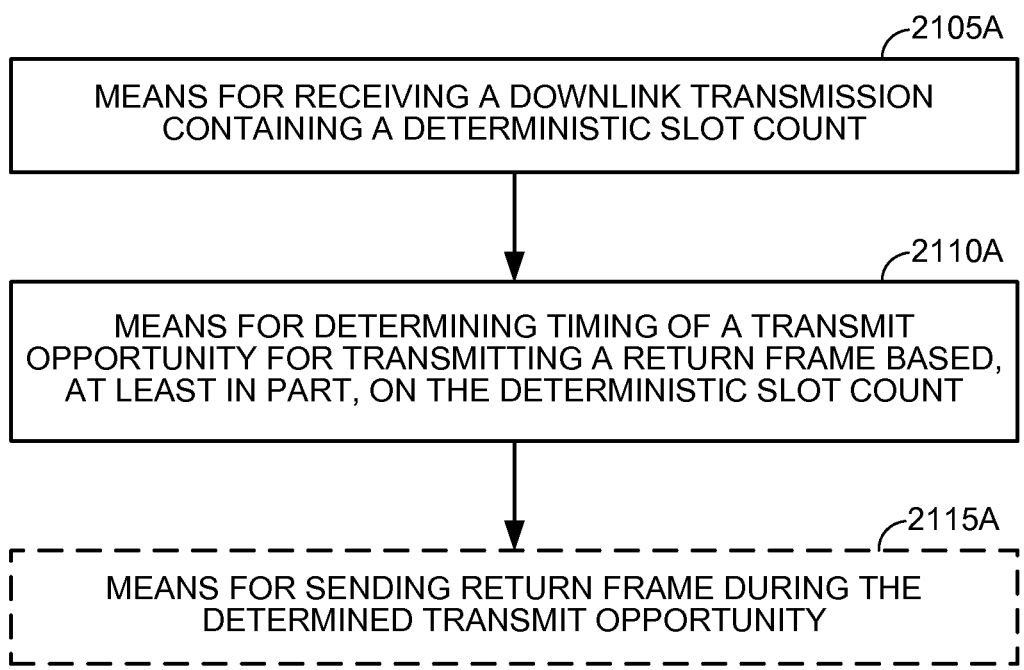

FIG. 21 illustrates example operations for receiving a downlink transmission from an AP that may include a deterministic backoff for return transmissions in accordance with certain aspects of the present disclosure. The operations may be performed, for example, by one of multiple stations receiving downlink transmissions (e.g., via SDMA) from an AP.

The operations begin, at 2105, by receiving a downlink transmission containing a deterministic slot count. At 2110, timing of a transmit opportunity for transmitting a return frame is determined based, at least in part, on the deterministic slot count. Optionally (as indicated by dashed lines in FIG. 21), at 2115, a return frame may be transmitted in the determined transmit opportunity.

Figure 22:
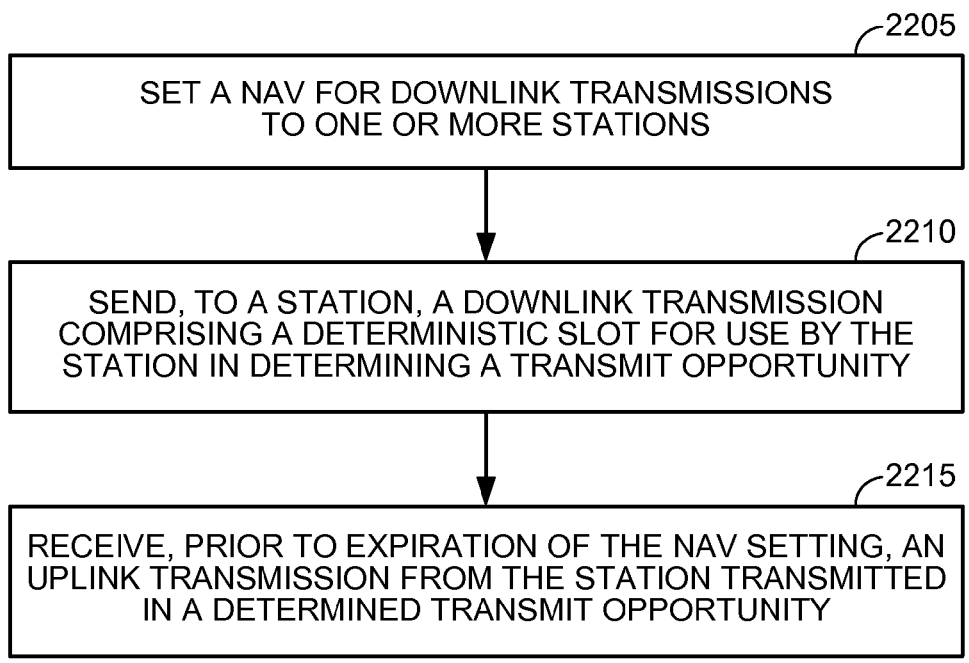
FIGS. 22 and 22a illustrate example operations for transmitting a downlink transmission with a deterministic slot count, in accordance with certain aspects of the present disclosure.
Figure 22A:
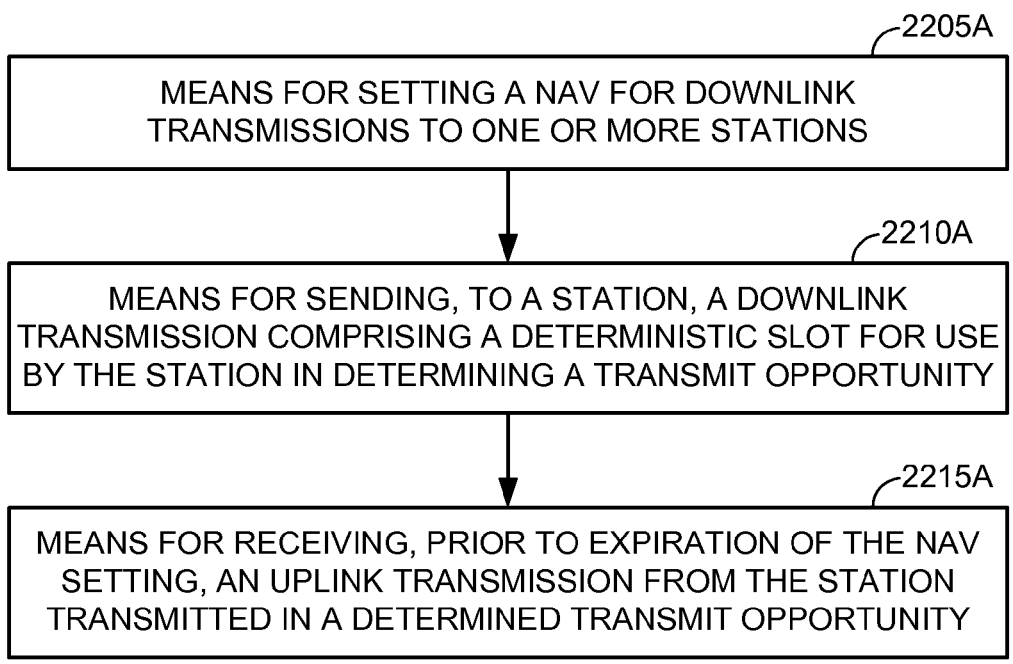

FIG. 22 illustrates example operations for sending a downlink transmission from an AP that may include a deterministic backoff for return transmissions in accordance with certain aspects of the present disclosure. The operations may be performed, for example, by an AP sending downlink transmissions (e.g., via SDMA) to multiple stations.

The operations begin, at 2205, by setting a NAV for downlink transmissions to one or more stations. At 2210, a downlink transmission is sent to a station, the downlink transmission comprising a deterministic slot for use by the station in determining a transmit opportunity. At 2115, an uplink transmission may be received from the station, the uplink transmission transmitted in a determined transmit opportunity prior to expiration of the NAV setting.

Figure 23:
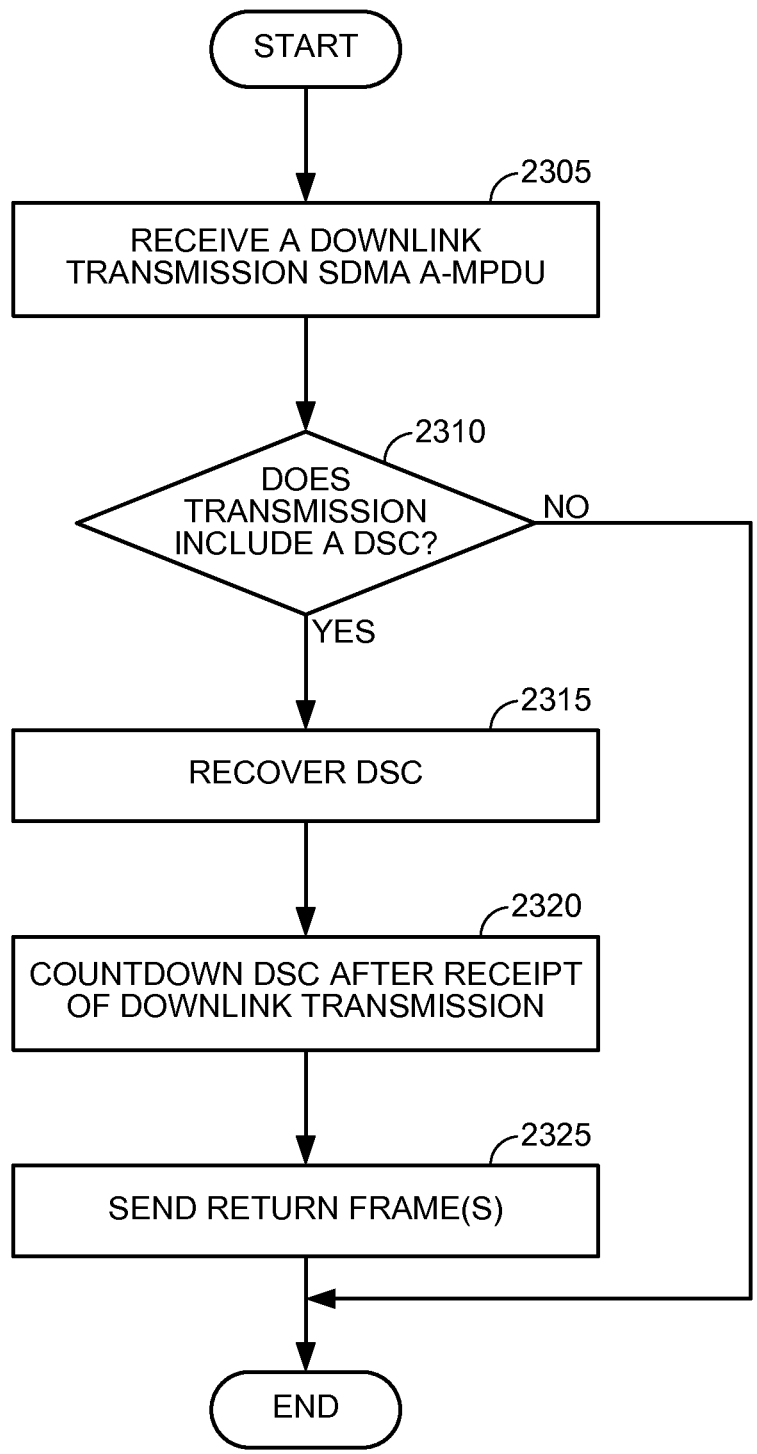
FIG. 23 illustrates a method according to an aspect for receiving downlink transmissions that may include a deterministic slot count.

FIG. 23 illustrates an example method of receiving downlink transmissions from an AP that may include a deterministic backoff for return transmissions in accordance with certain aspects of the present invention. In operation 2305, a station receives a downlink SDMA A-MPDU containing information addressed to the station. Then operation 2310 is performed. Operation 2310 determines if the received SDMA A-MPDU includes a DSC field containing a deterministic slot count to be used by the station for its TXOP.

If operation 2310 determines that the downlink transmission does not include a deterministic slot count, the method ends. If operation 2310 determines that there is a deterministic slot count contained in the downlink transmission, then operation 2315 is executed to recover the deterministic slot count to be used by the station. Then operation 2320 is executed. In operation 2320, the station counts down the deterministic slot count once the downlink transmission has been received. Then operation 2325 is executed. In operation 2325, the station sends its return frame(s) in response to the downlink transmission. In certain aspects the return frame(s) may be a BA frame. In other aspects, the return frame(s) may be an A-MPDU including a BA and uplink data. The method then exits.

Figure 24:
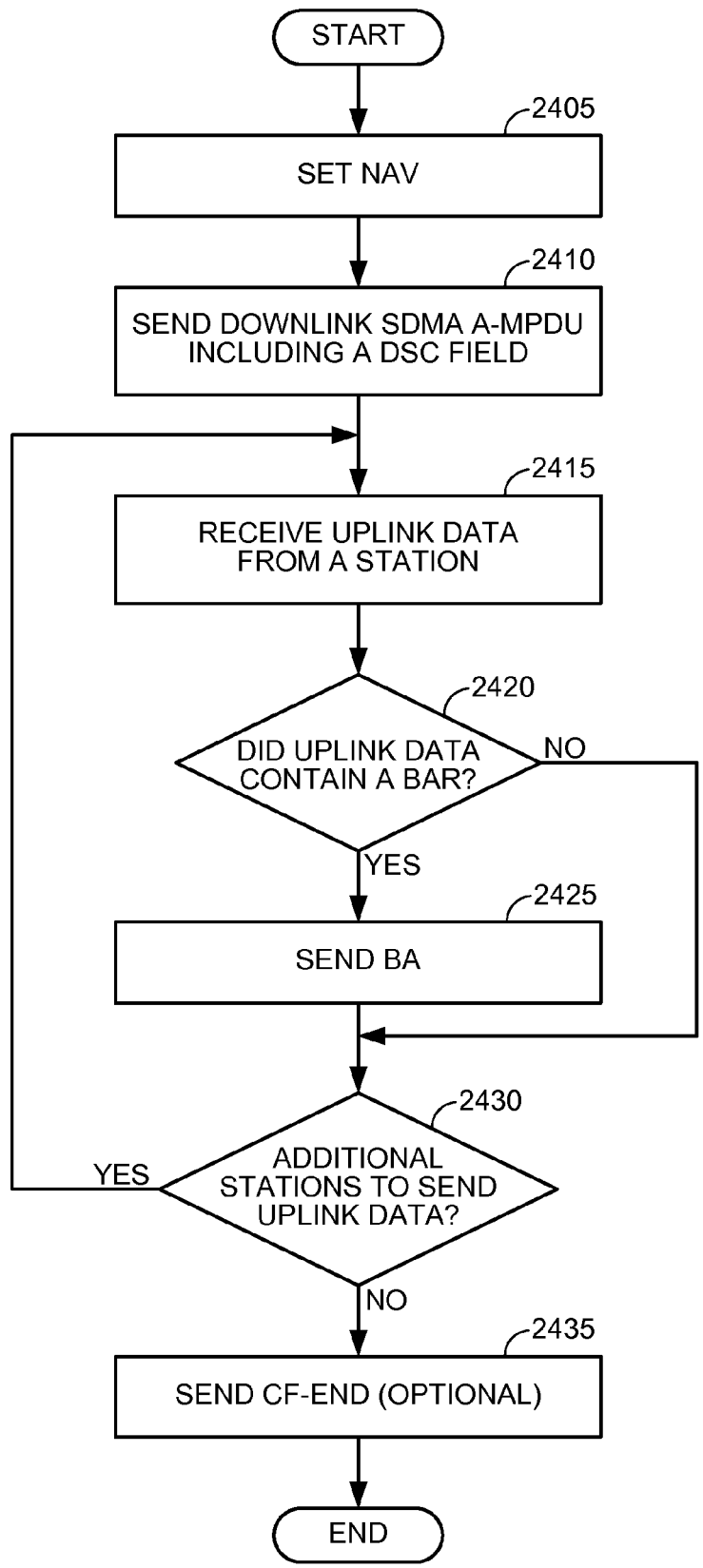
FIG. 24 illustrates a method according to an aspect for implementing a deterministic channel backoff.

FIG. 24 illustrates an example method for deterministic backoff channel access that may be used for downlink transmissions in accordance with certain aspects of the present invention. At operation 2405, the AP sets a NAV for the longest downlink SDMA TXOP. The downlink SDMA TXOP may contain downlink data for several stations. In certain aspects the NAV may be sent as part of a CTS frame while in other aspects the NAV may be sent in a non-SDMA frame such as a DSC frame.

After operation 2405, operation 2410 is performed. In operation 2410 a downlink transmission such as an SDMA A-MPDU including a DSC field is sent. Then operation 2415 is performed. In operation 2415 uplink data from one of the addressed stations is received. Then operation 2420 is performed. In operation 2420, the uplink frame is checked to determine if a BAR is included in the transmission. If operation 2420 determines that a BAR is included in the transmission, then operation 2425 is performed. Otherwise operation 2430 is performed.

In operation 2425 a BA is sent. Then operation 2430 is performed. In operation 2430 it is determined if there are additional stations that need to send uplink data. If there is an additional station that needs to send uplink data, then operation 2415 is performed. If operation 2430 determines that no additional stations need to send uplink data, then operation 2435 is performed.

In operation 2435, an optional CF-End frame may be sent. Then the method exits.

DSC with Power Saving

To save power, STAs listening to the medium may switch off their receiver for the duration indicated in the PHY header, when no MAC portion can be received (because the MCS is not supported by the STA) or the when DA does not match the STA MAC address. The latter may also occur when a reception error occurs. A reception error cannot be verified because the FCS will not be received, but this does not matter because a faulty and therefore different MAC address would not have lead to a successful reception.

Physical Layer Header with Access Point Identifier

In the distributed channel access method described above, in which stations (STAs) are assigned an order in a sequence at which the STAs are allowed to transmit, the moment of transmission may be determined by counting the number of preceding frames for certain aspects. However, when an overlapping network is located close to one of the STAs, a transmission from that network may be interpreted as a preceding transmission from one of the STAs in the sequence. This may potentially cause the STA to access the wireless medium at the wrong moment, and the STA may become partly synchronized to the overlapping network when this happens.

Accordingly, what is needed are techniques and apparatus for preventing the STA from transmitting at the wrong moment.

For certain aspects, the physical layer (PHY) header includes an identifier of the Basic Service Set (BSS) to which the STAs are associated. The identifier may be included in a number of space time streams (Nsts) field of a PHY header, which currently has no meaning in Single User (SU) transmissions (i.e., from a STA to an access point (AP)). The Nsts typically only has a meaning in Multi-User (MU) transmissions, which are restricted to transmissions from an AP to several STAs at once.

Figure 25:
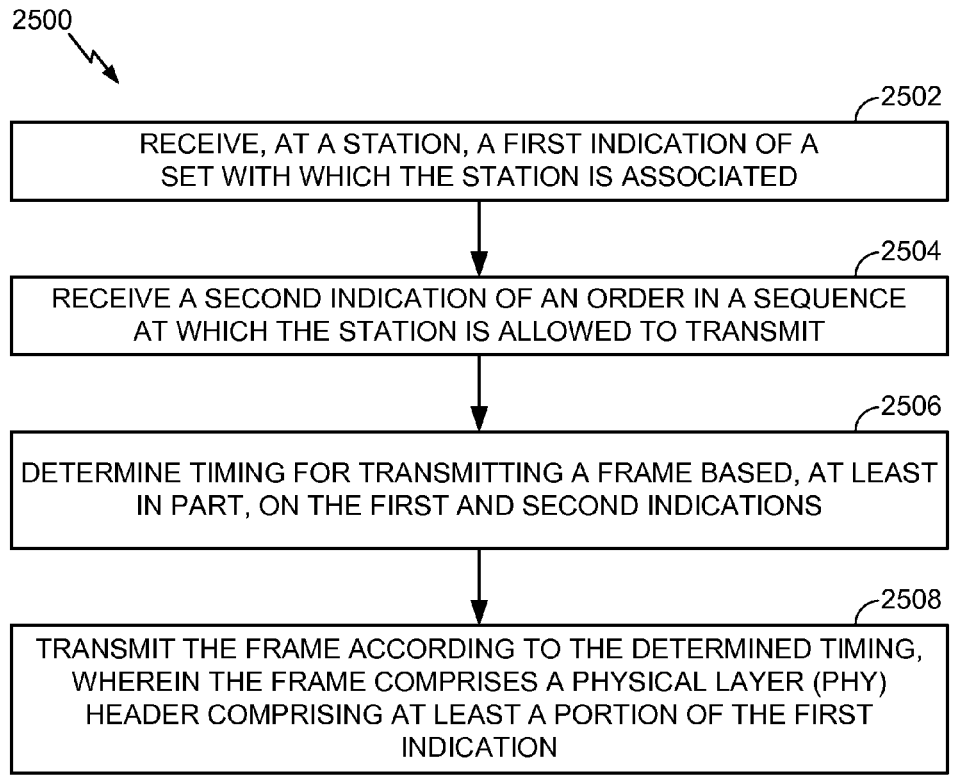
FIG. 25 illustrates example operations for determining timing for transmitting a frame based at least in part on an indication of a set with which a station is associated, in accordance with certain aspects of the present disclosure.

FIG. 25 illustrates example operations 2500 for determining timing for transmitting a frame based at least in part on an indication of a set with which a station is associated, in accordance with certain aspects of the present disclosure. The operations 2500 may be performed, for example, by a STA (e.g., an access terminal 120).

The operations 2500 may begin at 2502 by receiving, at the station, a first indication of a set with which the station is associated. The set may comprise a BSS. The first indication may comprise an identifier for the BSS (e.g., a BSS identifier (BSSID)) or for the AP (e.g., an AP identifier (APID)) in the BSS.

Figure 26:
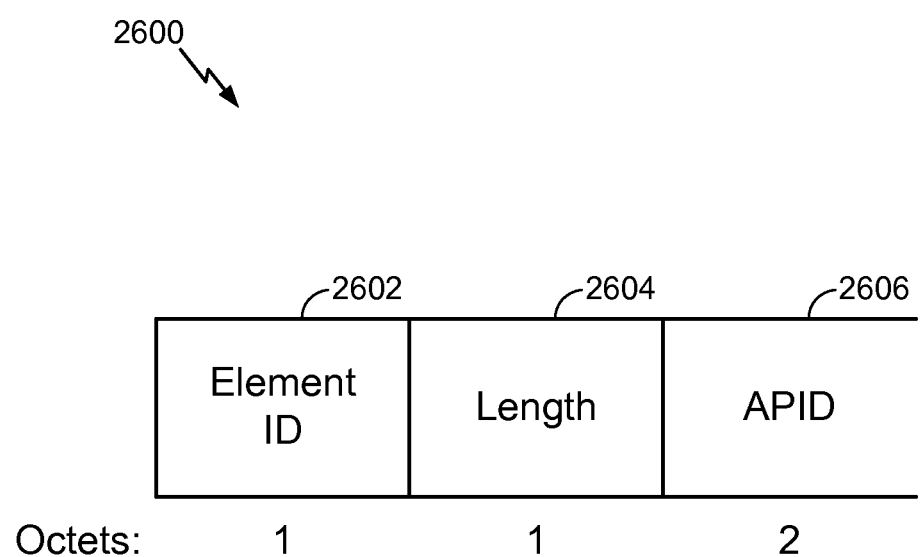
FIG. 26 conceptually illustrates an example access point identifier (APID) information element (IE), in accordance with certain aspects of the present disclosure.

The AP identifier (or BSS identifier) may be signaled to the associated STAs through the Association Response frame, by including an Access Point Identifier (APID) information element (IE) in this response frame. FIG. 26 conceptually illustrates an example APID IE 2600, in accordance with certain aspects of the present disclosure. The APID IE 2600 includes an Element ID field 2602 comprising one octet, a Length field 2604 comprising one octet, and an APID field 2606 comprising two octets as shown. The Element ID field 2602 may be defined similar to the Element ID field in Table 7-26 of IEEE 802.11-2007.

The Length field 2604 may be set to 2 to indicate the remainder of the APID IE 2600 includes 2 octets. The APID field 2606 may be set to the APID of the AP in the BSS to which the STA associates. For certain aspects, only the 9 least significant bits (LSBs) of the APID are included in the Nsts field of the PHY header, or only 9 LSBs of the 16-bit APID field 2606 are defined as the APID.

Returning the FIG. 25, the station may receive, at 2504, a second indication of an order in a sequence at which the station is allowed to transmit. For certain aspects, the second indication may comprise a deterministic slot count (DSC) as described above. The second indication may be included in an A-MPDU or other SDMA downlink transmission.

At 2506, the station may determine timing for transmitting a frame based, at least in part, on the first and second indications. For certain aspects, determining the timing may comprise counting a number of frames received with at least a portion of the first indication and ignoring received frames with an identifier that does not match the at least the portion of the first indication. Counting the number of frames may be similar to the counting described with respect to FIG. 12. For certain aspects, the station may terminate this sequential access procedure if the station receives a frame with an identifier that does not match at least a portion of the first indication (e.g., 9 LSBs of the APID).

At 2508, the station may transmit the frame according to the determined timing. The transmitted frame may comprise a PHY header comprising at least a portion of the first indication. For example the PHY header may comprise 9 LSBs of the APID in the APID field 2606 of the received APID IE 2600.

Figure 27:
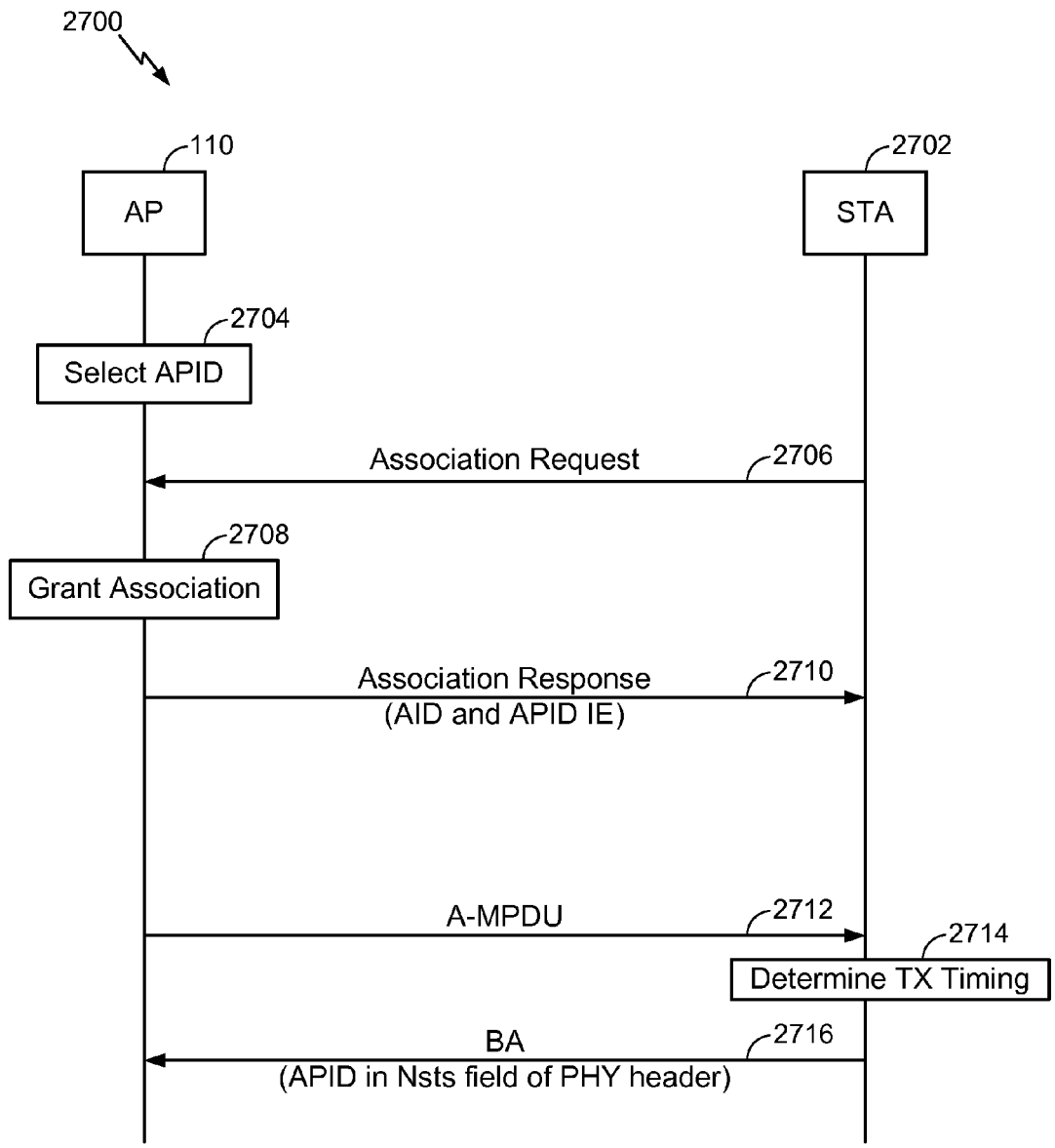
FIG. 27 is an example call flow for communications between an access point and a station during association and subsequent communication, in accordance with certain aspects of the present disclosure.

FIG. 27 is an example call flow 2700 for communications between an access point 110 and a station (STA) 2702 during association and subsequent communication, in accordance with certain aspects of the present disclosure. At 2704, the AP may select an APID.

According to certain aspects, an AP may select APIDs randomly. An AP may avoid the use of certain APID values based on the properties in the PHY header, such as long strings of 0s. For other aspects, the APID may be selected from a selected list of values that meet a certain parameter or enhance certain properties of the PHY header, such as peak-to-average-power ratio (PAPR). The AP may avoid selecting APIDs that are observed on the channel where the AP intends to start a network. From the remaining set of values, the AP may select a value randomly. Such selection mechanisms may ensure that overlapping APs will have a high likelihood of selecting different APIDs. APIDs observed on channels other than the intended operating channel may be reused.

At 2706, the STA 2702 may send an Association Request message to the AP. This may occur when the STA 2702 moves into an area covered by the AP 110 or decides to handover to the AP, perhaps because the STA is receiving a stronger signal from this particular AP over other APs in the vicinity. The STA 2702 may receive a beacon from the AP 110 before deciding to send the Association Request message.

At 2708, the AP 110 may grant the STA 2702 association, such that the STA is associated with the BSS to which the AP belongs. In response to the Association Request message, the AP 110 may send an Association Response message at 2710, which typically includes an association identifier (AID). The Association Response message may also include an APID IE 2600 as described above or some other indication of an identifier for the BSS or AP.

At 2712, the AP 110 may transmit an SDMA downlink transmission, such as an A-MPDU, to multiple STAs including the STA 2702. For certain aspects, the A-MPDU may include an indication (e.g., a DSC) of an order in a sequential response sequence for each of the STAs.

At 2714, the STA 2702 may determine the timing for transmission of a frame in response to the SDMA transmission as described above. A STA that is assigned an order in a sequential response sequence counts only PHY headers that contain the right APID. A STA may terminate its sequential access procedure when it receives a PHY header that specifies a different APID than the APID of the AP that assigned the sequence.

Once the STA 2702 determines that it is time to transmit the response frame (e.g., by counting frames received from other STAs having the correct APID value), the STA may transmit the response frame (e.g., a block acknowledgment) at 2716. The response frame may comprise at least a portion of the APID in the Nsts field of the PHY header.

For certain aspects, the APID may also be used to save power during transmissions that are not from the BSS corresponding to the APID. To this end, the AP may assign itself an APID that does not conflict with any of the association identifiers (AIDs) that the AP hands out to its own STAs (i.e., STA associated with the AP).

In order to make APIDs visible to scanning APs, the APID may be included in Beacons and Probe Responses transmitted by APs for certain aspects.

Figure 28:
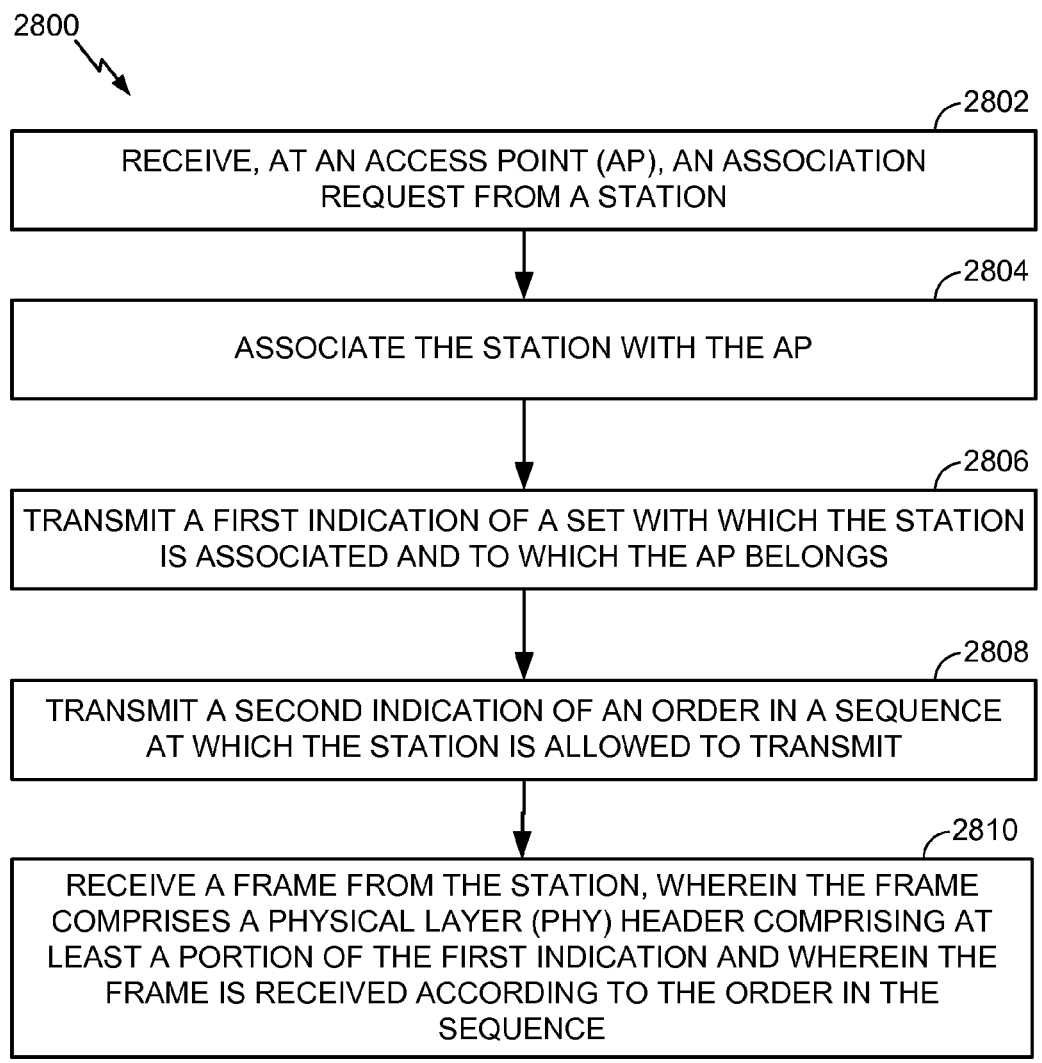
FIG. 28 illustrates example operations for associating a station and sending the station an indication of a set with which the station is associated, in accordance with certain aspects of the present disclosure.

FIG. 28 illustrates example operations 2800 for associating a station and sending the station an indication of a set with which the station is associated, in accordance with certain aspects of the present disclosure. The operations 2800 may be performed, for example, by an AP 110.

The operations 2800 may begin at 2802 by receiving, at an AP, an association request from a station. At 2804, the AP may associate the station with the AP (i.e., grant the association request). At 2806, the AP may transmit a first indication of a set with which the station is associated and to which the AP belongs. The set may comprise a BSS. The first indication may comprise an identifier for the BSS (e.g., a BSSID) or for the AP (e.g., an APID) in the BSS.

At 2808, the AP may transmit a second indication of an order in a sequence at which the station is allowed to transmit. For certain aspects, the AP may receive a frame (e.g., a response frame) from the station at 2810. The frame may comprise a PHY header comprising at least a portion of the first indication. The frame may be received according to the order in the sequence as described above.

Figure 25A:
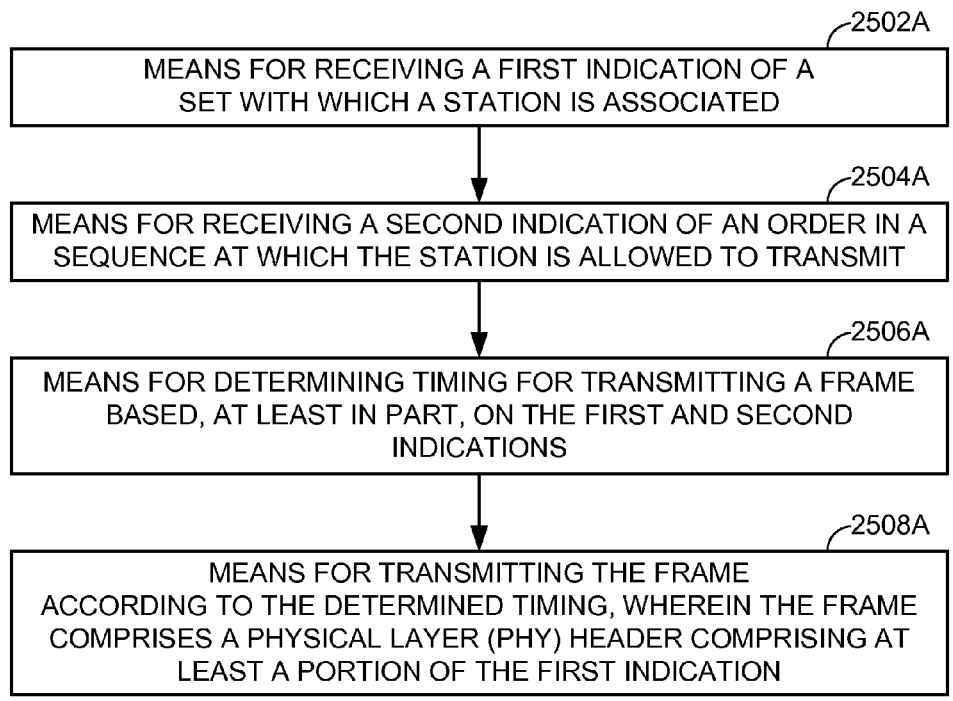
FIG. 25A illustrates example means capable of performing the operations shown in FIG. 25.
Figure 28A:
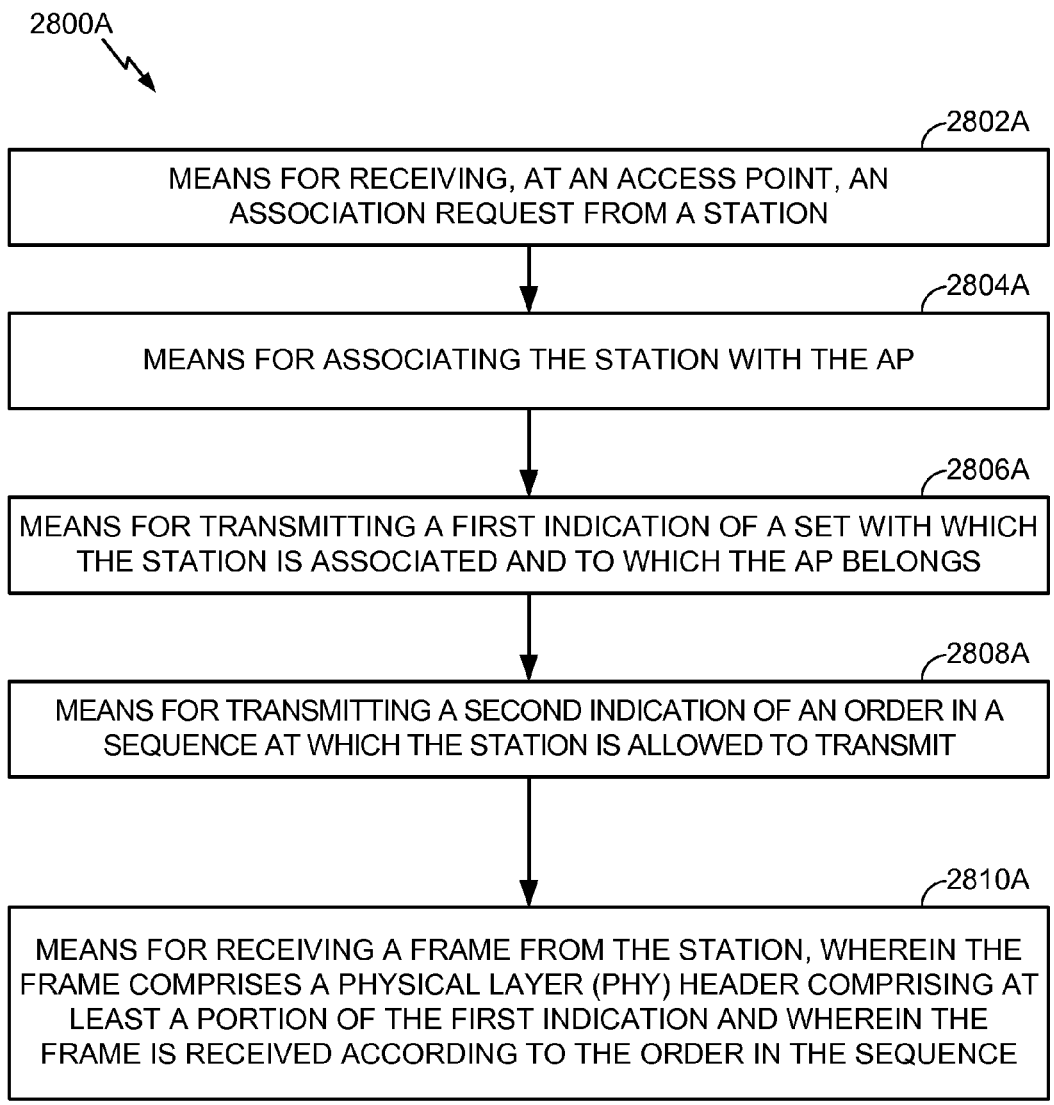
FIG. 28A illustrates example means capable of performing the operations shown in FIG. 28.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 2500 and 2800 illustrated in FIGS. 25 and 28 correspond to means illustrated in FIGS. 25A and 28A, respectively.

For example, means for transmitting may comprise a transmitter (e.g., the transmitter unit 222) and/or an antenna 224 of the access point 110 or the transmitter unit 254 and/or an antenna 252 of the access terminal 120 illustrated in FIG. 2. Means for receiving may comprise a receiver (e.g., the receiver unit 254) and/or an antenna 252 of the access terminal 120 or the receiver unit 222 and/or an antenna 224 of the access point 110 illustrated in FIG. 2. Means for processing, means for determining, and/or means for terminating may comprise a processing system, which may include one or more processors, such as the RX spatial processor 260, the RX data processor 270, the TX data processor 288, the TX spatial processor 290, and/or the controller 280 of the access terminal 120 illustrated in FIG. 2. Means for processing, means for determining, means for associating, and/or means for selecting may comprise a processing system, which may include one or more processors, such as the RX spatial processor 240, the RX data processor 242, the TX data processor 210, the TX spatial processor 220, and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover: a, b, c, a-b, a-c, b-c, and a-b-c.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles, or any combination thereof.

The various illustrative logic blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The steps disclosed in the example algorithms may be interchanged in their order without departing from the scope and spirit of the present disclosure. Also, the steps illustrated in the example algorithms are not exclusive and other steps may be included or one or more of the steps in the example algorithms may be deleted without affecting the scope and spirit of the present disclosure.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While various aspects of the present disclosure have been described herein, each with one or more technical features, those skilled in the art will appreciate that different technical features of the various aspects described herein may also be combined resulting in various combinations not explicitly described herein. Further, certain aspects may involve multiple technical features, one or more of which may be omitted, again resulting in various combinations of one or more technical features not explicitly described herein.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by an access point (AP), comprising:
    receiving, at the AP, an association request message from a station;
    associating the station with the AP in response to the association request message;
    transmitting a first indication of a set with which the station is associated and to which the AP belongs; and
    receiving a frame from the station, wherein the frame comprises a physical layer (PHY) header comprising at least a portion of the first indication.

2. The method of claim 1, wherein the set comprises a basic service set (BSS) and wherein the first indication comprises an identifier for the BSS or for the AP in the BSS.

3. The method of claim 2, wherein transmitting the first indication comprises transmitting an information element (IE) comprising the identifier for the AP.

4. The method of claim 1, further comprising transmitting a second indication of an order in a sequence at which the station is allowed to transmit, wherein the frame is received according to the order in the sequence.

5. The method of claim 4, further comprising transmitting a spatial division multiple access (SDMA) transmission, wherein the frame is received in response to the SDMA.

6. The method of claim 1, wherein the PHY header comprises a Number of Space Time Streams (Nsts) field comprising the at least the portion of the first indication.

7. The method of claim 6, wherein the at least the portion of the first indication comprises 9 least significant bits (LSBs) of the first indication.

8. The method of claim 1, wherein transmitting the first indication comprises transmitting an association response message comprising the first indication.

9. The method of claim 1, further comprising randomly selecting the first indication of the set.

10. An access point (AP) for wireless communications, comprising:
   a receiver configured to receive an association request message from a station;
   a processing system configured to associate the station with the AP in response to the association request message; and
   a transmitter configured to transmit a first indication of a set with which the station is associated and to which the AP belongs, wherein the receiver is configured to receive a frame from the station, wherein the frame comprises a physical layer (PHY) header comprising at least a portion of the first indication.

11. The AP of claim 10, wherein the set comprises a basic service set (BSS) and wherein the first indication comprises an identifier for the BSS or for the AP in the BSS.

12. The AP of claim 11, wherein the transmitter is configured to transmit an information element (IE) comprising the identifier for the AP.

13. The AP of claim 10, wherein the transmitter is configured to transmit a second indication of an order in a sequence at which the station is allowed to transmit, wherein the frame is received according to the order in the sequence.

14. The AP of claim 13, wherein the transmitter is configured to transmit a spatial division multiple access (SDMA) transmission, wherein the frame is received in response to the SDMA.

15. The AP of claim 10, wherein the PHY header comprises a Number of Space Time Streams (Nsts) field comprising the at least the portion of the first indication.

16. The AP of claim 15, wherein the at least the portion of the first indication comprises 9 least significant bits (LSBs) of the first indication.

17. The AP of claim 10, wherein the transmitter is configured to transmit an association response message comprising the first indication.

18. The AP of claim 10, further comprising a processing system configured to select the first indication of the set from a list of values meeting a certain parameter.

19. The AP of claim 18, wherein the certain parameter comprises a peak-to-average-power ratio (PAPR).

20. An access point (AP) for wireless communications, comprising:
   means for receiving an association request message from a station;
   means for associating the station with the AP in response to the association request message;
   means for transmitting a first indication of a set with which the station is associated and to which the AP belongs; and
   means for receiving a frame from the station, wherein the frame comprises a physical layer (PHY) header comprising at least a portion of the first indication.

21. A non-transitory computer-readable medium comprising instructions to cause an access point (AP) to:
   receive, at the AP, an association request message from a station;
   associate the station with the AP in response to the association request message;
   transmit a first indication of a set with which the station is associated and to which the AP belongs; and
   receive a frame from the station, wherein the frame comprises a physical layer (PHY) header comprising at least a portion of the first indication.

* * * * *